United States Patent
Mikami et al.

(10) Patent No.: US 11,188,287 B2
(45) Date of Patent: Nov. 30, 2021

(54) DISPLAY CONTROL APPARATUS, DISPLAY CONTROL METHOD, AND COMPUTER PROGRAM

(71) Applicant: SONY CORPORATION, Tokyo (JP)

(72) Inventors: Masanori Mikami, Kanagawa (JP); Jiro Kawano, Saitama (JP); Keisuke Saito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/956,079

(22) PCT Filed: Nov. 16, 2018

(86) PCT No.: PCT/JP2018/042472
§ 371 (c)(1),
(2) Date: Jun. 19, 2020

(87) PCT Pub. No.: WO2019/130896
PCT Pub. Date: Jul. 4, 2019

(65) Prior Publication Data
US 2020/0319839 A1    Oct. 8, 2020

(30) Foreign Application Priority Data

Dec. 27, 2017    (JP) ............................. JP2017-250533

(51) Int. Cl.
*G06F 3/14*    (2006.01)
*G06F 3/01*    (2006.01)

(52) U.S. Cl.
CPC ............ *G06F 3/1431* (2013.01); *G06F 3/011* (2013.01)

(58) Field of Classification Search
CPC ........ G06F 3/1431; G06F 3/011; G06F 3/017; G06F 3/0304; G06F 3/04815; G06F 3/0484; A63F 13/26; A63F 13/213
USPC .......................................................... 345/1.1
See application file for complete search history.

(56) References Cited

U.S. PATENT DOCUMENTS

| 9,804,731 B1 | 10/2017 | Baloga | |
| 2010/0259473 A1* | 10/2010 | Sakata | H04N 21/47 345/156 |
| 2010/0304871 A1* | 12/2010 | Yamada | A63F 13/525 463/43 |

(Continued)

FOREIGN PATENT DOCUMENTS

| JP | 2014-078238 A | 5/2014 |
| JP | 2016-136350 A | 7/2016 |

(Continued)

*Primary Examiner* — Tom V Sheng
(74) *Attorney, Agent, or Firm* — Paratus Law Group, PLLC

(57) ABSTRACT

There is provided a display control apparatus presenting a display object such that movement of the display object from one display area to another display area can be grasped more intuitively. The display control apparatus includes a display controller, based on a movement operation by a human present in a space between a first display area and a second display area on a display object in the first display area, moving the display object, the display controller, when the display object reaches a first end of the first display area, causing the display object to appear at a second end of the second display area corresponding to the first end.

19 Claims, 19 Drawing Sheets

(56) References Cited

U.S. PATENT DOCUMENTS

| | | | |
|---|---|---|---|
| 2012/0249429 A1* | 10/2012 | Anderson | G06F 3/017 |
| | | | 345/173 |
| 2012/0249443 A1* | 10/2012 | Anderson | G06F 3/017 |
| | | | 345/173 |
| 2013/0278501 A1 | 10/2013 | Bulzacki | |
| 2014/0101578 A1* | 4/2014 | Kwak | G06F 1/1647 |
| | | | 715/761 |
| 2015/0067601 A1* | 3/2015 | Bernstein | G06F 3/04815 |
| | | | 715/823 |
| 2015/0346835 A1* | 12/2015 | Bell | G06F 3/0304 |
| | | | 345/156 |
| 2015/0356838 A1* | 12/2015 | Obana | A63F 13/54 |
| | | | 340/407.1 |
| 2017/0090555 A1* | 3/2017 | Nekozuka | G06F 3/017 |
| 2017/0182412 A1* | 6/2017 | Osawa | A63F 13/213 |
| 2019/0244416 A1* | 8/2019 | Tamaoki | A63F 13/211 |
| 2020/0150916 A1* | 5/2020 | Jiang | G06F 3/0304 |
| 2021/0006749 A1* | 1/2021 | Koike | H04N 7/142 |

FOREIGN PATENT DOCUMENTS

| | | |
|---|---|---|
| JP | 2016-192216 A | 11/2016 |
| JP | 2018-084858 A | 5/2018 |

\* cited by examiner

DISPLAY CONTROL APPARATUS, DISPLAY CONTROL METHOD, AND COMPUTER PROGRAM

CROSS REFERENCE TO PRIOR APPLICATION

This application is a National Stage Patent Application of PCT International Patent Application No. PCT/JP2018/042472 (filed on Nov. 16, 2018) under 35 U.S.C. § 371, which claims priority to Japanese Patent Application No. 2017-250533 (filed on Dec. 27, 2017), which are all hereby incorporated by reference in their entirety.

FIELD

The present disclosure relates to a display control apparatus, a display control method, and a computer program.

BACKGROUND

In recent years, there is a technique that displays a display object in a display area. For example, there is a technique projecting an image as an example of the display object from a light source onto a screen to display the display object in the display area (refer to Patent Literature 1, for example). According to such a technique, the display object displayed in the display area is viewed by a human. In this situation, the display object may be moved from one display area to another display area.

CITATION LIST

Patent Literature

Patent Literature 1: JP 2015-127755 A

SUMMARY

Technical Problem

However, a technique that presents a display object such that movement of the display object from one display area to another display area can be grasped more intuitively is desired to be provided.

Solution to Problem

According to the present disclosure, a display control apparatus is provided that includes a display controller, based on a movement operation by a human present in a space between a first display area and a second display area on a display object in the first display area, moving the display object, the display controller, when the display object reaches a first end of the first display area, causing the display object to appear at a second end of the second display area corresponding to the first end.

According to the present disclosure, a display control method is provided that includes, based on a movement operation by a human present in a space between a first display area and a second display area on a display object in the first display area, moving the display object; and by a processor, when the display object reaches a first end of the first display area, causing the display object to appear at a second end of the second display area corresponding to the first end.

According to the present disclosure, a computer program is provided that causes a computer to function as a display control apparatus including a display controller, based on a movement operation by a human present in a space between a first display area and a second display area on a display object in the first display area, moving the display object, the display controller, when the display object reaches a first end of the first display area, causing the display object to appear at a second end of the second display area corresponding to the first end.

Advantageous Effects of Invention

As described in the foregoing, the present disclosure provides a technique that can present a display object such that movement of the display object from one display area to another display area can be grasped more intuitively is provided. The above effect is not necessarily limiting; together with the above effect or in place of the above effect, any effects shown in the present specification or other effects that can be grasped from the present specification may be produced.

DESCRIPTION OF EMBODIMENTS

The following describes a preferred embodiment of the present disclosure in detail with reference to the accompanying drawings. In the present specification and the drawings, components having substantially the same functional configuration are denoted by the same symbol to omit a duplicate description.

In the present specification and the drawings, a plurality of components having substantially the same functional configuration may be distinguished from each other by being denoted by different figures after the same symbol. Note that when there is no need to particularly distinguish the components having substantially the same functional configuration, they are denoted only by the same symbol.

The description will be given in the following order:
0. Background
1. Embodiment of Present Disclosure
 1.1. Exemplary System Configuration
 1.2. Exemplary Functional Configuration
 1.3. Functional Details of Display Control System
  1.3.1. Movement Operation on Object
  1.3.2. Touch Operation on Object
  1.3.3. Modification of Operator
 1.4. Exemplary Hardware Configuration
2. Conclusion

0. BACKGROUND

In recent years, there is a technique that displays a display object in a display area. For example, there is a technique projecting an image as an example of the display object from a light source onto a screen to display the display object in the display area. According to such a technique, the display object displayed in the display area is viewed by a human. In this situation, the display object may be moved from one display area to another display area.

However, a technique that presents the display object such that movement of the display object from the one display area to the other display area can be grasped more intuitively is desired to be provided. In the following description, the display object may be referred to simply as an "object."

1. EMBODIMENT OF PRESENT DISCLOSURE

[1. 1. Exemplary System Configuration]

Figure 1:
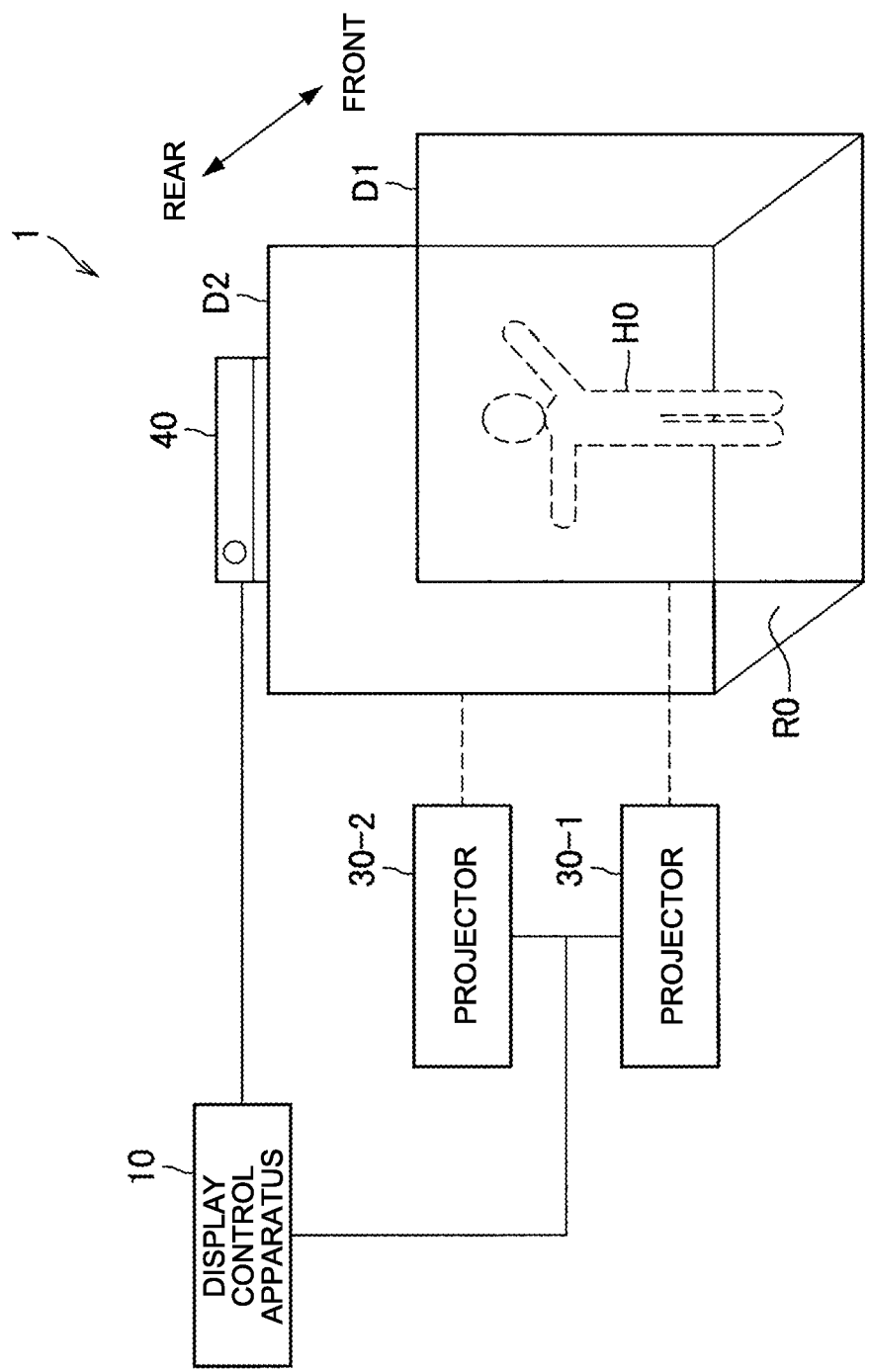
FIG. 1 is a diagram of an exemplary configuration of a display control system according to an embodiment of the present disclosure.

The following first describes an exemplary configuration of a display control system according to an embodiment of the present disclosure with reference to the drawings. FIG. 1 is a diagram of the exemplary configuration of the display control system according to the embodiment of the present disclosure. As illustrated in FIG. 1, this display control system 1 includes a display control apparatus 10, a projector 30-1, a projector 30-2, and a sensor 40.

It is assumed that the display control apparatus 10 is a computer.

The projector 30-1 performs display in a first display area D1 in accordance with control by the display control apparatus 10, whereas the projector 30-2 performs display in a second display area D2 in accordance with control by the display control apparatus 10. Referring to FIG. 1, illustrated is an inner area R0 of a space between the first display area D1 and the second display area D2.

FIG. 1 illustrates an example in which a human H0 is present in the inner area R0. However, as described below in detail, a plurality of humans may be present in the inner area R0.

In the following, for the convenience of description, the near side of FIG. 1 is treated as "front," whereas the far side of FIG. 1 is treated as "rear." Referring to FIG. 1, the first display area D1 is present in the front of the second display area D2 (the second display area D2 is present in the rear of the first display area D1). Given this situation, the human H0 present in the inner area R0 can view the first display area (hereinafter, also referred to as "front") D1 when facing the front and can view the second display area (hereinafter, also referred to as "back") D2 when facing the rear.

The present specification describes an example in which a screen (hereinafter, also referred to as a "front side screen") is present in the first display area D1, whereas a screen (hereinafter, also referred to as a "back side screen") is present in the second display area D2, and the projector 30-1 projects light onto the front side screen of the first display area D1 to perform display in the first display area D1, whereas the projector 30-2 projects light onto the back side screen to perform display in the second display area D2. However, display in each of the first display area D1 and the second display area D2 may be performed in any way.

The projector 30-1 may be a hologram projector projecting a hologram onto the first display area D1, for example. In this case, the front side screen is not necessarily present in the first display area D1. Similarly, the projector 30-2 may be a hologram projector projecting a hologram onto the second display area D2. In this case, the back side screen is not necessarily present in the second display area D2.

In place of the projector 30-1 and the front side screen, any of various kinds of display apparatuses performing display in the first display area D1 may be used. Similarly, in place of the projector 30-2 and the back side screen, any of various kinds of display apparatuses performing display in the second display area D2 may be used. The display apparatus, which is not limited to a particular type, may be a liquid crystal display, an organic electro-luminescence (EL) display, or another display. The display apparatus may be a display having light transmitting properties (a transmission display).

The sensor 40 detects the position of a human present within a detectable range. The sensor 40 is not limited to a particular type. The sensor 40 may be a visible-light camera, an infrared sensor, an ultrasonic sensor, a millimeter-wave radar, or another sensor, for example. The present specification mainly assumes a case in which the sensor 40 is a depth sensor, and a three-dimensional position of the human including the distance from the sensor 40 to the human is detected by the sensor 40.

The detectable range of the sensor 40 includes at least the inner area R0. A detection result by the sensor 40 is provided to the display control apparatus 10 to be used for control by the display control apparatus 10.

Thus, the exemplary configuration of the display control system 1 according to the present embodiment has been described.

[1.2. Exemplary Functional Configuration]

Figure 2:
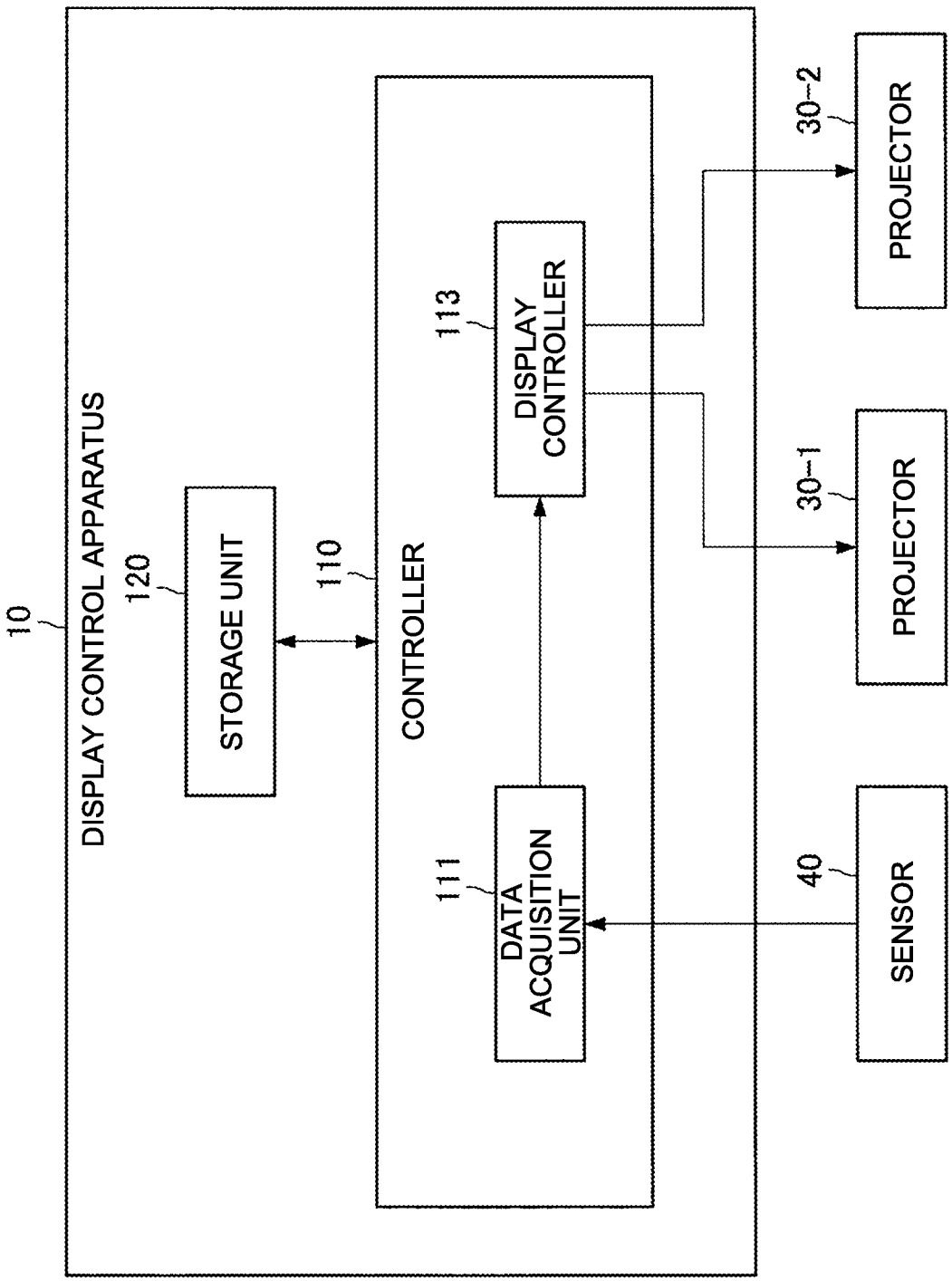
FIG. 2 is a block diagram of an exemplary functional configuration of a display control apparatus according to the embodiment.

Subsequently, the following describes an exemplary functional configuration of the display control apparatus 10 according to the present embodiment. FIG. 2 is a block diagram of the exemplary functional configuration of the display control apparatus 10 according to the embodiment. As illustrated in FIG. 2, the display control apparatus 10 includes a controller 110 and a storage unit 120. The following describes these functional blocks included in the display control apparatus 10.

The controller 110 executes control of the units of the display control apparatus 10. The controller 110 may be configured by a processor such as a central processing unit (CPU), for example. When the controller 110 is configured by the processor such as a CPU, the processor may be configured by an electronic circuit. As illustrated in FIG. 2, the controller 110 has a data acquisition unit 111 and a display controller 113. These blocks included in the controller 110 will be described below in detail.

The storage unit 120 is a storage device storing therein computer programs executed by the controller 110 and storing therein data required for execution of the computer programs. The storage unit 120 temporarily stores therein data for computations by the controller 110. The storage unit 120 may be a magnetic storage device, a semiconductor storage device, an optical storage device, or a magneto-optical storage device.

Thus, the exemplary functional configuration of the display control apparatus 10 according to the present embodiment has been described.

[1.3. Functional Details of Display Control System]

Subsequently, the following describes functional details of the display control system 1.

(1.3.1. Movement Operation on Object)

The following first describes a movement operation on an object from the first display area D1 to the second display area D2.

Figure 3:
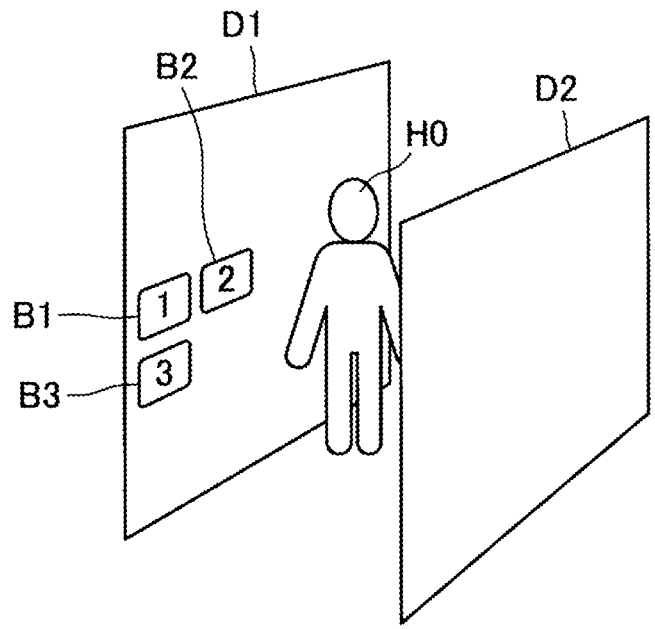
FIG. 3 is a diagram of exemplary display of objects in a first display area.

FIG. 3 is a diagram of exemplary display of objects in the first display area D1. Referring to FIG. 3, a human H0 is present in a space between the first display area D1 and the second display area D2. The present specification mainly assumes a case in which an object is moved from the first display area D1 to the second display area D2. Such being the case, the display controller 113 causes the first display area D1 to display objects B1 to B3. However, in like manner with the case in which the object is moved from the first display area D1 to the second display area D2, the object may be moved from the second display area D2 to the first display area D1.

Although the objects B1 to B3 are rectangular icons with figures written thereon in the example illustrated in FIG. 3, the details written on the objects, the shape of the objects, the number of the objects, and the like are not limited to particular ones. Assumed is a case in which the human H0 has a desire to move the object B3.

Figure 4:
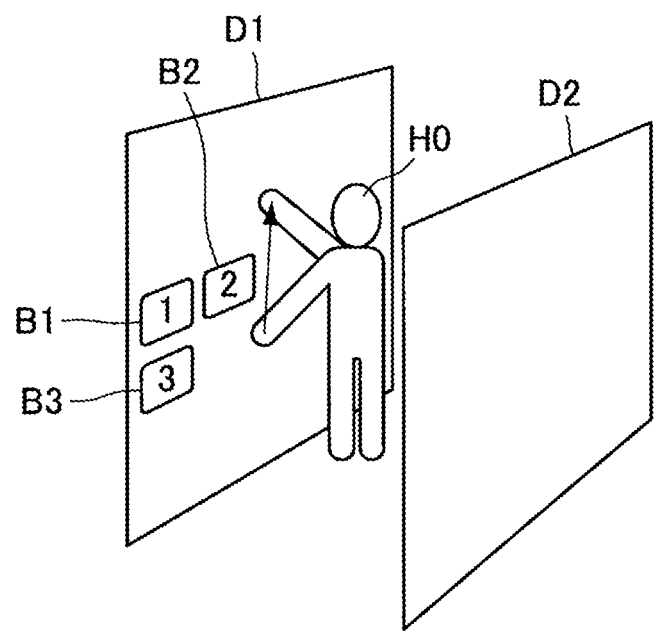
FIG. 4 is a diagram of an exemplary moving operation on an object in the first display area.

FIG. 4 is a diagram of an exemplary moving operation on the object B3 in the first display area D1. Referring to FIG. 4, as an example of the moving operation, illustrated is an operation in which the human H0 wants to move the object B3, while indicating the object B3 by hand, and move the hand in a direction in which the human H0 wants to move the object B3. In this process, the position and the shape of the hand of the human H0 are detected by the sensor 40, and the position and the shape of the hand of the human H0 are acquired by the data acquisition unit 111.

The display controller 113 detects a point of intersection of an extension line of the hand and the first display area D1 as pointing coordinates from the position and the shape of the hand of the human H0 and recognizes the object B3 present within a certain range of the pointing coordinates as an object to be moved. In addition, the display controller 113 calculates a movement amount of the object B3 based on a movement amount of the pointing coordinates. The display controller 113 moves the object B3 based on the calculated movement amount. Assumed is a case in which a velocity vector of the object B3 is determined corresponding to a movement vector of the pointing coordinates as an example. However, as described below, the movement operation is not limited to the example.

Figure 5:
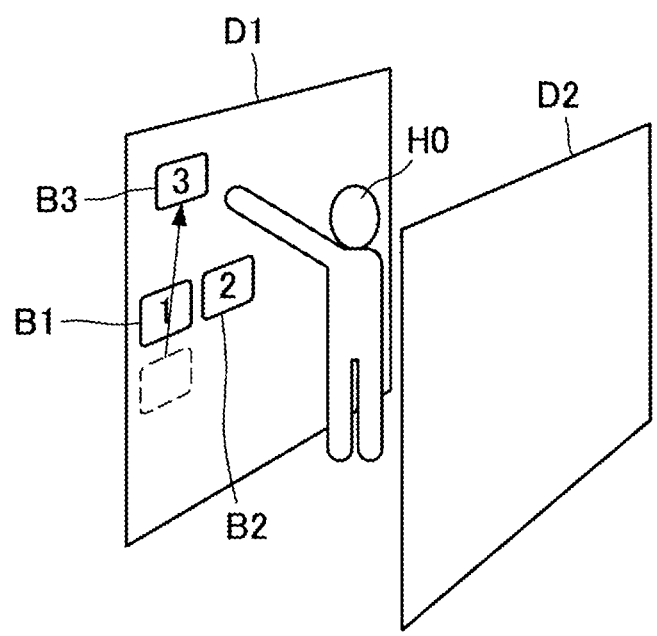
FIG. 5 is a diagram of exemplary movement of the object in the first display area.

FIG. 5 is a diagram of exemplary movement of the object B3 in the first display area D1. Referring to FIG. 5, illustrated is an example in which the object B3 is moved in the first display area D1 based on a movement operation by the human H0. Movement of the object B3 in the first display area D1 is not limited. For example, when the velocity vector of the object B3 has been determined, the object B3 may naturally experience uniform linear motion through the first display area D1. Alternatively, the object B3 may move through the first display area D1 on the assumption that it moves while receiving gravity in order to give a feeling of lifting the object B3 to the human H0. Alternatively, the velocity vector of the object B3 may be attenuated.

Subsequently, the object B3 reaches a first end (an upper end, for example) of the first display area D1. When the object B3 reaches the first end (the upper end, for example) of the first display area D1, the display controller 113 causes the object B3 to appear at a second end (an upper end, for example) of the second display area D2 corresponding to the first end (the upper end, for example). With this operation, the object B3 can be presented such that movement of the object B3 from the first display area D1 to the second display area D2 can be grasped more intuitively (the object B3 can be moved while giving a feeling as if the first display area D1 and the second display area D2 spatially connected to each other, to the human H0).

The present specification mainly describes an example in which the upper end of the first display area D1 and the upper end of the second display area D2 correspond to each other. However, the corresponding ends of the respective first display area D1 and second display area D2 are not limited to the upper ends. Lower ends of the respective first display area D1 and second display area D2 may correspond to each other, for example.

Alternatively, ends in a right-and-left direction of the respective first display area D1 and second display area D2 may correspond to each other. In this case, when viewed from the human H0, a right end of the first display area D1 and a left end of the second display area D2 may correspond to each other, whereas a left end of the first display area D1 and a right end of the second display area D2 may correspond to each other. Alternatively, when viewed from the human H0, the right end of the first display area D1 and the right end of the second display area D2 may correspond to each other, whereas the left end of the first display area D1 and the left end of the second display area D2 may correspond to each other.

A timing at which the object B3 is caused to appear in the second display area D2 is assumed to be various timings; for example, the object B3 may be caused to appear in the second display area D2 when reaching the upper end of the first display area D1 or may be caused to appear in the second display area D2 when a certain time has elapsed after reaching the upper end of the first display area D1. The following describes examples of timing at which the object B3 is caused to appear in the second display area D2.

Figure 6:
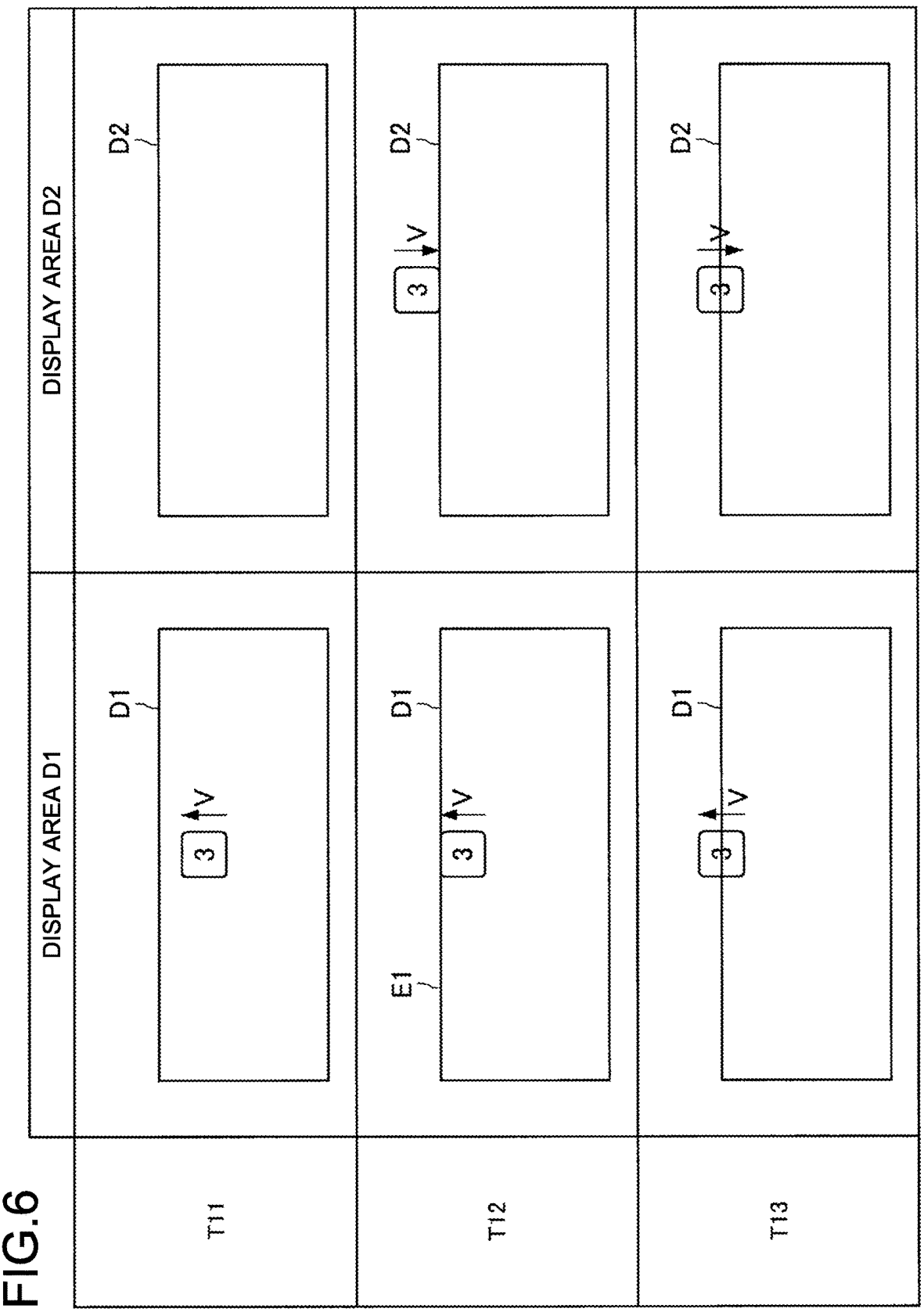
FIG. 6 is a diagram for illustrating a first example of a timing at which the object is caused to appear in a second display area.

FIG. 6 is a diagram for illustrating a first example of the timing at which the object B3 is caused to appear in the second display area D2. Referring to FIG. 6, illustrated is how the object B3 is displayed at each time (a time T11 to a time T13) in the first display area D1 and the second display area D2. As illustrated in FIG. 6, while moving upward inside the first display area D1 (the time T11), the object B3 reaches the upper end (the time T12) and then goes outside the upper end (the time T13).

In the second display area D2, at the beginning, the object B3 is not caused to appear. For example, when the upper end of the first display area D1 is set as a boundary E1, the display controller 113 may start to cause the object B3 to appear at the upper end of the second display area D2 when the object B3 reaches the upper end of the first display area D1 (the boundary E1) (the time T12). With this operation, the object B3 is caused to appear in the second display area D2 when reaching the upper end of the first display area D1.

Figure 7:
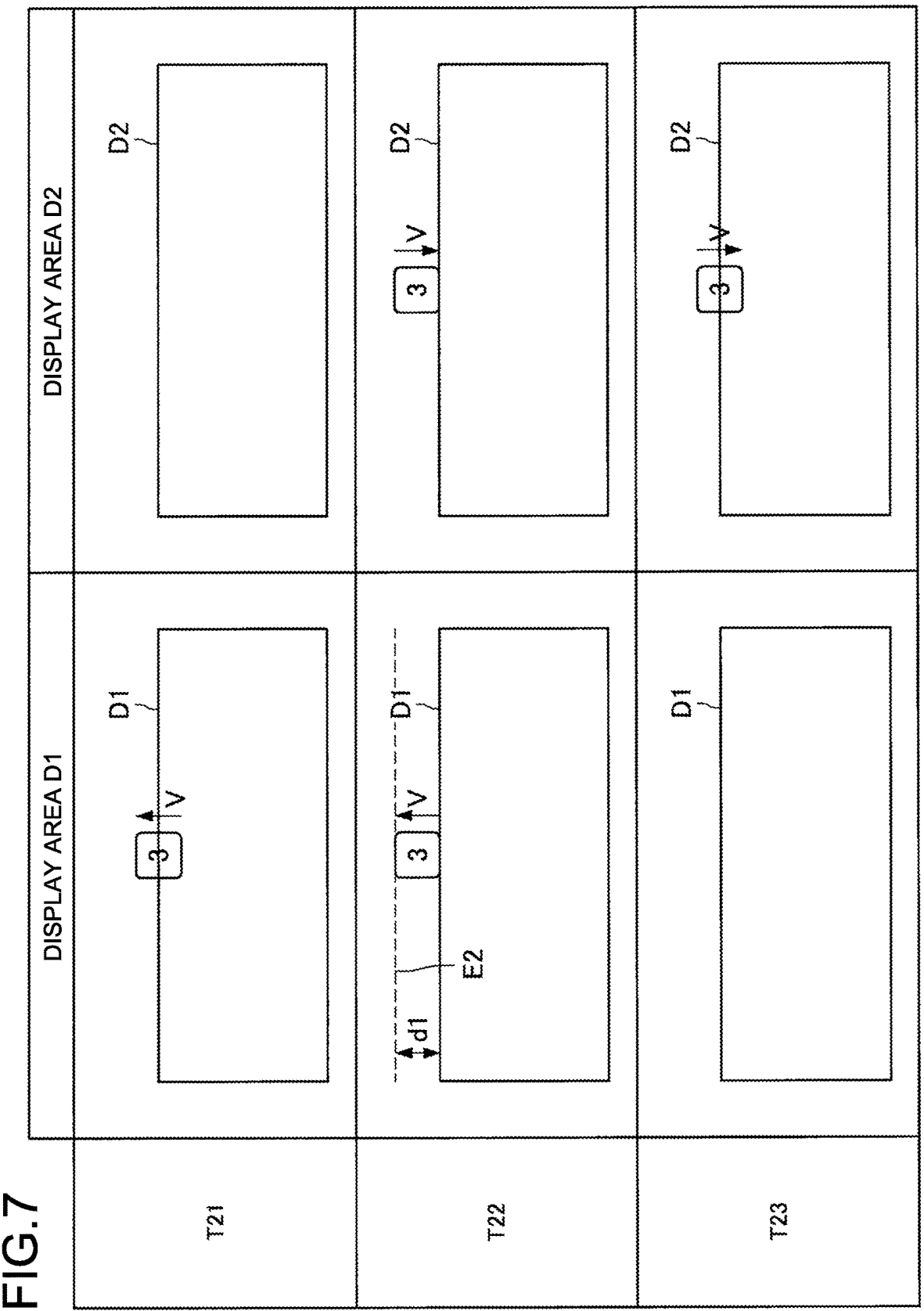
FIG. 7 is a diagram for illustrating a second example of the timing at which the object is caused to appear in the second display area.

FIG. 7 is a diagram for illustrating a second example of the timing at which the object B3 is caused to appear in the second display area D2. Referring to FIG. 7, illustrated is how the object B3 is displayed at each time (a time T21 to a time T23) in the first display area D1 and the second display area D2. As illustrated in FIG. 7, while moving upward inside the first display area D1, the object B3 reaches the upper end and then goes outside the upper end (the time T21).

In the second display area D2, at the beginning, the object B3 is not caused to appear. For example, when a virtual line outside the first display area D1 is set as a boundary E2, the display controller 113 may start to cause the object B3 to appear at the upper end of the second display area D2 when the object B3 reaches the virtual line (the boundary E2) (the time T22). With this operation, the object B3 is caused to appear in the second display area D2 when a certain time has elapsed after reaching the upper end of the first display area D1.

In the example illustrated in FIG. 7, the display controller 113 sets the virtual line (the boundary E2) at a position separated from the upper end of the first display area D1 by the same length as a width d1 of the object B3. However, the distance between the upper end of the first display area D1 and the virtual line (the boundary E2) is not limited to a particular distance.

Figure 8:
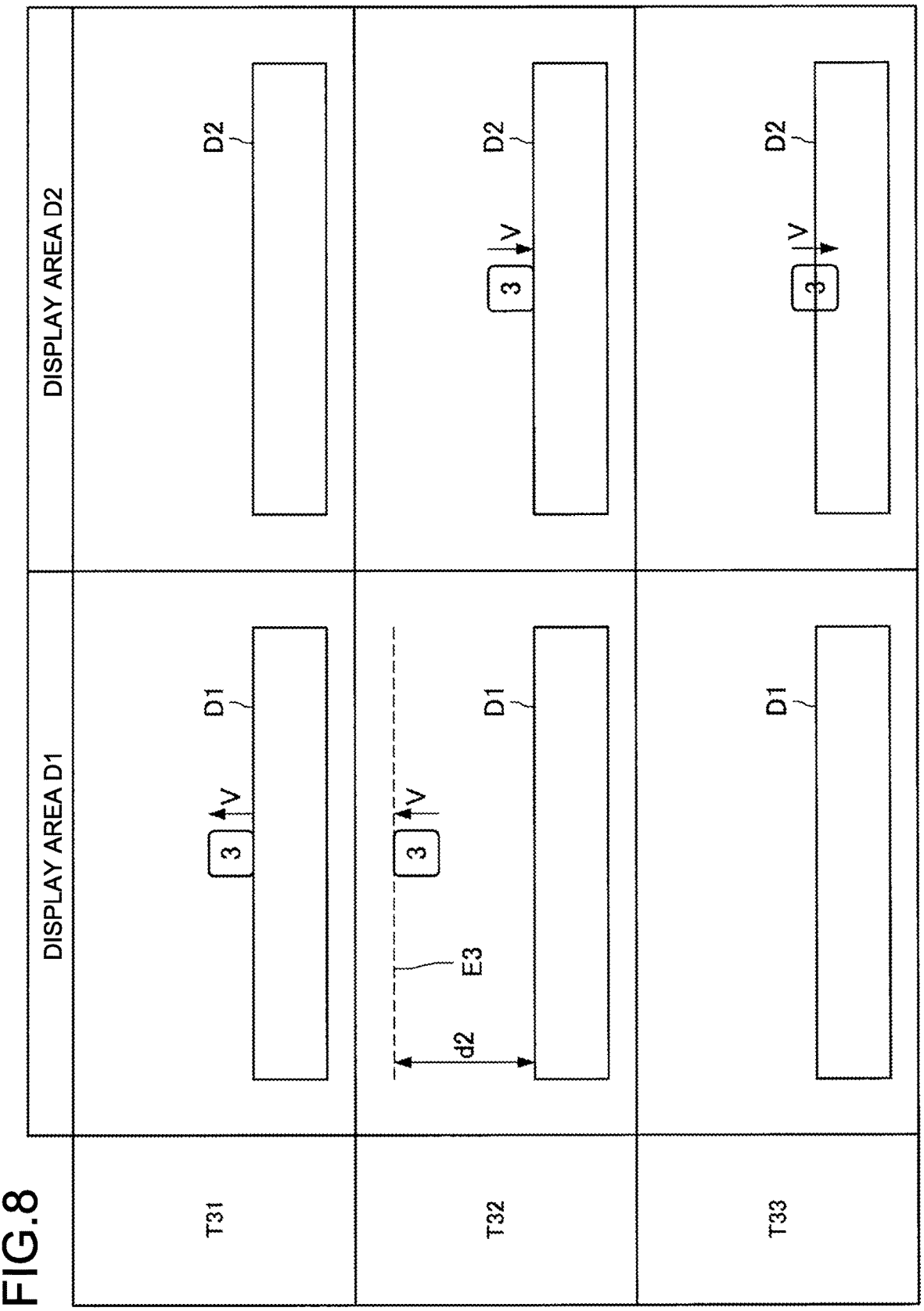
FIG. 8 is a diagram for illustrating a third example of the timing at which the object is caused to appear in the second display area.

FIG. 8 is a diagram for illustrating a third example of the timing at which the object B3 is caused to appear in the second display area D2. Referring to FIG. 8, illustrated is how the object B3 is displayed at each time (a time T31 to a time T33) in the first display area D1 and the second display area D2. As illustrated in FIG. 8, while moving upward inside the first display area D1, the object B3 reaches the upper end and then goes outside the upper end (the time T31).

In the second display area D2, at the beginning, the object B3 is not caused to appear. In like manner with the example illustrated in FIG. 7, when a virtual line outside the first display area D1 is set as a boundary E3, the display controller 113 may start to cause the object B3 to appear at the upper end of the second display area D2 when the object B3 reaches the virtual line (the boundary E3) (the time T32). With this operation, the object B3 is caused to appear in the second display area D2 when a certain time has elapsed after reaching the upper end of the first display area D1.

In the example illustrated in FIG. 8, the display controller 113 sets the virtual line (the boundary E3) at a position separated from the upper end of the first display area D1 by a width d2 (, which is longer than the width d1 illustrated in FIG. 7). The display controller 113 may set the virtual line (the boundary E3) at any position.

For example, the display controller 113 may set the virtual line (the boundary E3) at a position separated from the upper end of the first display area D1 by a length corresponding to a spacing between the first display area D1 and the second display area D2. The spacing between the first display area D1 and the second display area D2 may be detected based on a detection result by the sensor 40. Alternatively, the display controller 113 may set the virtual line (the boundary E3) at a position separated from the upper end of the first display area D1 by a length corresponding to the velocity vector of the object B3.

For example, it is assumed that a larger distance between the upper end of the first display area D1 and the boundary gives a longer time from when the object B3 reaches the upper end of the first display area D1 to when the object B3 is caused to appear in the second display area D2. Given this, the display controller 113 may increase the width between the upper end of the first display D1 and the virtual line (the boundary E3) for a longer spacing between the first display area D1 and the second display area D2. With this setting, movement of the object B3 to the first display area D1 and the second display area D2, which are present in the real space, can be grasped more intuitively.

Alternatively, it is assumed that a larger vertical component of the velocity vector of the object B3 gives a shorter time required for the object B3 to move by the same distance, and thus the display controller 113 may reduce the width between the upper end of the first display area D1 and the virtual line (the boundary E3). With this setting, movement of the object B3 to the first display area D1 and the second display area D2, which are present in the real space, can be grasped more intuitively. The vertical component of the velocity vector of the object B3 can vary depending on the type of the object B3.

Figure 9:
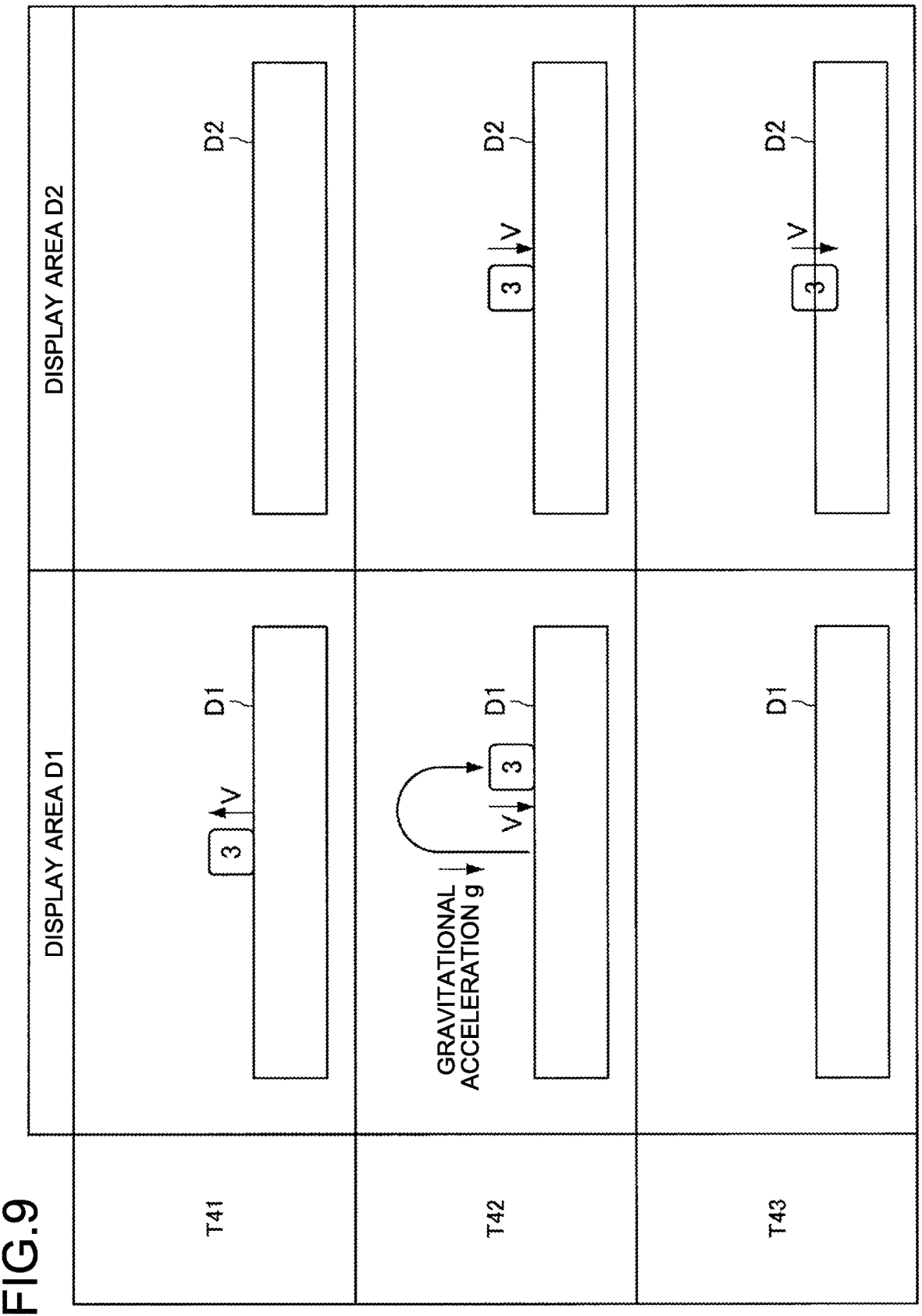
FIG. 9 is a diagram for illustrating a fourth example of the timing at which the object is caused to appear in the second display area.

FIG. 9 is a diagram for illustrating a fourth example of the timing at which the object B3 is caused to appear in the second display area D2. Referring to FIG. 9, illustrated is how the object B3 is displayed at each time (a time T41 to a time T43) in the first display area D1 and the second display area D2. As illustrated in FIG. 9, while moving upward inside the first display area D1, the object B3 reaches the upper end and then goes outside the upper end (the time T41).

In the second display area D2, at the beginning, the object B3 is not caused to appear. When the upper end of the first display area D1 is set as a boundary, the display controller 113 may start to cause the object B3 to appear at the upper end of the second display area D2 when the object B3 again reaches the boundary on the assumption that the object B3 has moved while receiving gravity in a space outside the upper end of the first display area D1 (T42). With this operation, the human H0 can be given a feeling as if the object B3, after going out of the upper end of the first display area D1 and moving through the real apace, reached the second display area D2.

As illustrated in FIG. 6 to FIG. 9, in causing the object B3 to appear in the second display area D2, the display controller 113 may cause the object B3 to gradually appear, instead of causing the entire object B3 to appear at one time.

For example, when there is a first part beyond the boundary in the object B3, the display controller 113 may perform control to cause a second part corresponding to the first part to be displayed in the second display area D2 (for example, the second part with the same area as that of the first area may be displayed in the second display area D2).

Figure 10:
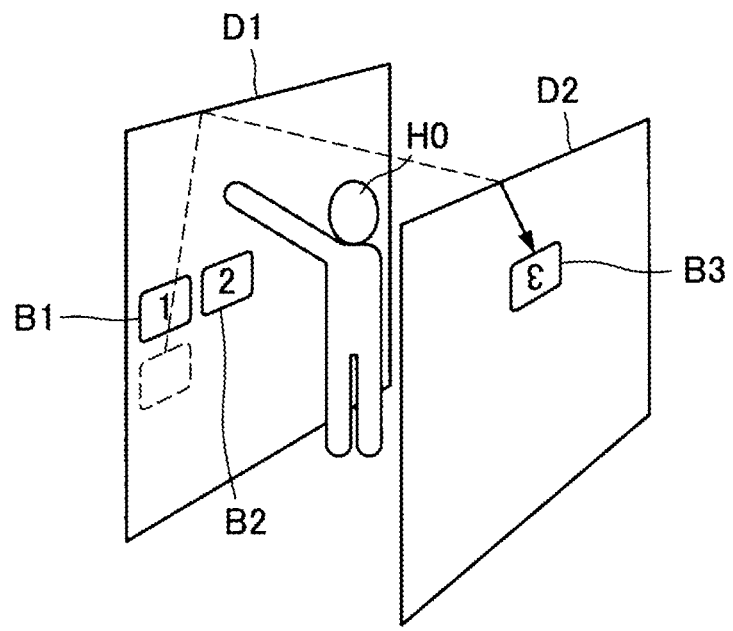
FIG. 10 is a diagram illustrating the appearance of the object that is caused to appear in the second display area.

FIG. 10 is a diagram illustrating the appearance of the object B3 that is caused to appear in the second display area D2. Referring to FIG. 10, illustrated is an example in which the object B3 is caused to appear at the upper end of the second display area D2 when the object B3 reaches the upper end of the first display area D1.

In the example illustrated in FIG. 10, the orientation of the object B3 is not different between a case in which the object B3 is displayed in the first display area D1 and a case in which the object B3 is displayed in the second display area D2 when viewed from the human H0. However, the orientation of the object B3 may be changed (may be reversed in an up-and-down direction, for example) between the case in which the object B3 is displayed in the first display area D1 and the case in which the object B3 is displayed in the second display area D2 when viewed from the human H0.

How the object B3 that is caused to appear in the second display area D2 moves inside the second display area D2 is not limited either. For example, the velocity vector of the object B3 in the first display area D1 (the upper end of the first display area D1, for example) (a first velocity vector) may be taken over by the velocity vector of the object B3 in the second display area D2 (the upper end of the second display area D2, for example) (a second velocity vector).

That is to say, the display controller 113 may determine the velocity vector of the object B3 in the second display area (the upper end of the second display area D2, for example) (the second velocity vector) based on the velocity vector of the object B3 in the first display area D1 (the upper end of the first display area D1, for example) (the first velocity vector).

For example, the display controller 113 may determine the velocity vector of the object B3 in the second display area (the upper end of the second display area D2, for example) (the second velocity vector) by reversing a vertical component of the velocity vector of the object B3 in the first display area D1 (the upper end of the first display area D1, for example) (the first velocity vector).

The above mainly describes examples in which the object B3 is caused to appear at the upper end of the second display area D2 unconditionally when the object B3 reaches the upper end of the first display area D1. However, even when the object B3 reaches the upper end of the first display area D1, the object B3 may be caused to appear at the upper end of the second display area D2 when a certain condition has been satisfied.

For example, the object B3 may be caused to appear at the upper end of the second display area D2 when the type of the movement operation satisfies a certain condition. That is to say, when the object B3 reaches the upper end of the first display area D1, the display controller 113 may perform control whether the object B3 is caused to appear at the upper end of the second display area D2 based on the type of the movement operation. With this operation, the human H0 can perform control whether the object B3 is caused to appear in the second display area D2 by the movement operation.

As an example, the type of the movement operation may include the number of operators performing the movement operation. For example, when the object B3 reaches the upper end of the first display area D1, the display controller 113 may cause the object B3 not to appear at the upper end of the second display area D2 when the number of operators (the number of fingers, for example) is a first number and may cause the object B3 to appear at the upper end of the second display area D2 when the number of operators (the number of fingers, for example) is a second number, which is different from the first number.

Figure 11:
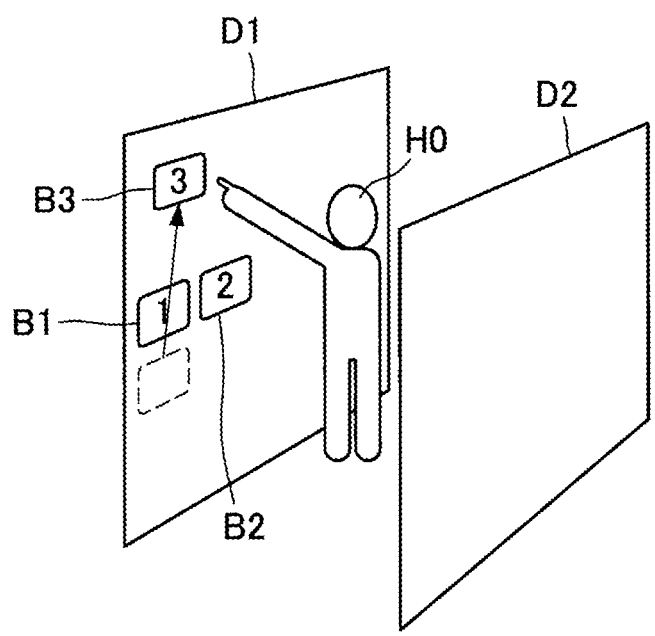
FIG. 11 is a diagram illustrating the appearance of the object when the number of operators is a first number.

FIG. 11 is a diagram illustrating the appearance of the object B3 when the number of operators is a first number. Referring to FIG. 11, the human H0 performs a movement operation with one finger. In such a case, even when the object B3 reaches the upper end of the first display area D1, the display controller 113 does not necessarily cause the object B3 to appear at the upper end of the second display area D2. The operators are not limited to fingers, and the number of operators is not limited to one.

Figure 12:
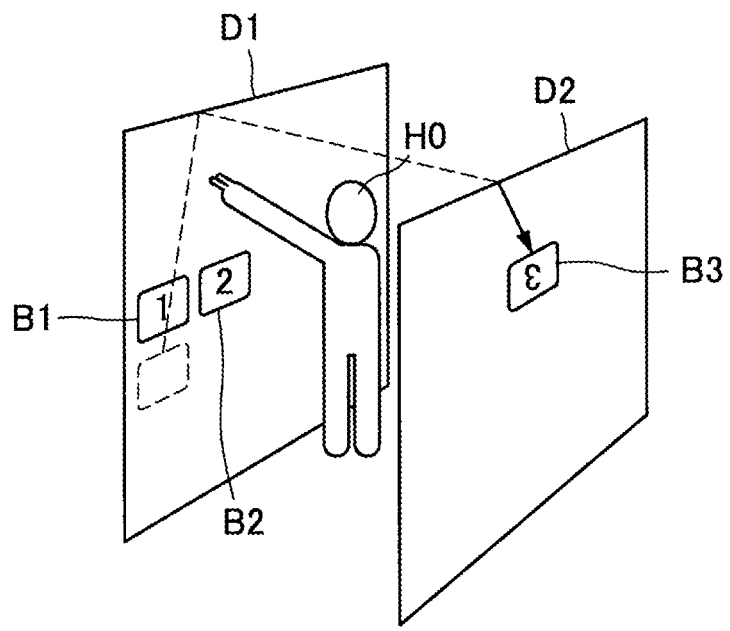
FIG. 12 is a diagram illustrating the appearance of the object when the number of operators is a second number.

FIG. 12 is a diagram illustrating the appearance of the object B3 when the number of operators is a second number. Referring to FIG. 12, the human H0 performs a movement operation with two fingers. In such a case, when the object B3 reaches the upper end of the first display area D1, the display controller 113 may cause the object B3 to appear at the upper end of the second display area D2. The operators are not limited to fingers, and the number of operators is not limited to two.

Thus, an example in which the type of the movement operation is used as the condition for causing the object B3 to appear at the upper end of the second display D2 has been described. However, the condition for causing the object B3 to appear at the upper end of the second display D2 is not limited to the condition. For example, when the object B3 reaches the upper end of the first display area D1, the display controller 113 may perform control whether the object B3 is caused to appear at the upper end of the second display area D2 based on a parameter related to movement of the object B3 (velocity or acceleration, for example).

For example, when the object B3 reaches the upper end of the first display area D1, the display controller 113 may cause the object B3 not to appear at the upper end of the second display area D2 when the parameter related to movement is lower than a threshold and may cause the object B3 to appear at the upper end of the second display area D2 when the parameter related to movement of the object B3 is higher than the threshold. When the parameter related to movement is the same as the threshold, the object B3 may or may not be caused to appear at the upper end of the second display area D2.

Movement of the object B3 in the second display area D2 is not limited either in like manner with the first display area D1. The object B3 may experience uniform linear motion in the second display area D2, for example. Alternatively, the object B3 may move through the second display area D2 on the assumption that the object B3 moves while receiving gravity. Alternatively, the velocity vector of the object B3 may be attenuated.

That is to say, the display controller 113 may control the object B3 such that the velocity vector of the object B3 in at least part of the first display area D1 and the second display area D2 is constant. Alternatively, the display controller 113 may control movement of the object B3 in at least part of the first display area D1 and the second display area D2 on the assumption that the display object B3 has moved while receiving at least a part of gravity. Alternatively, the display controller 113 may control the object B3 such that the velocity vector of the object B3 in at least part of the first display area D1 and the second display area D2 is attenuated.

Although the object B3 may continue to move in the second display area D2 (for example, when reaching an end, the object B3 may bounce back inside the second display area D2 from the end), it may stop in the second display area D2 when a certain stop condition is satisfied. In such a case, the stop condition is not limited to a particular condition. The following describes exemplary stop conditions.

Figure 13:
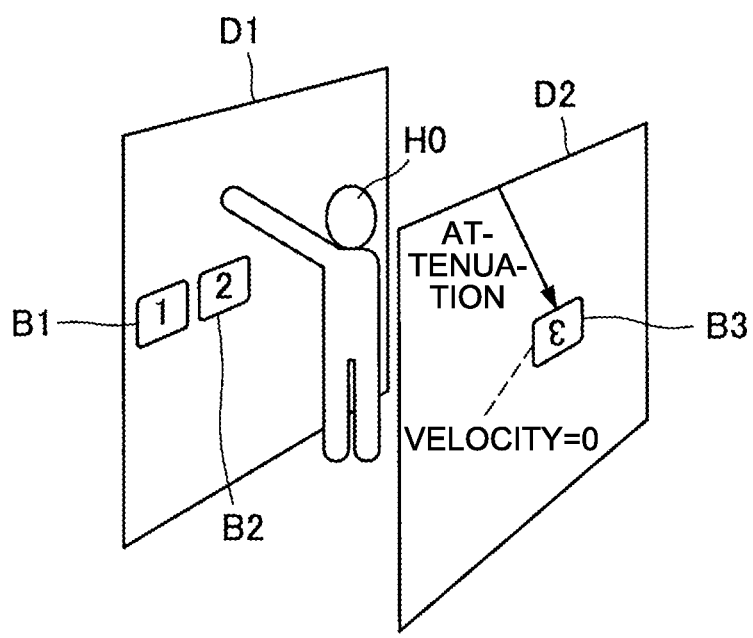
FIG. 13 is a diagram for illustrating a first example of a stop condition of the object.

FIG. 13 is a diagram for illustrating a first example of the stop condition of the object B3. As illustrated in FIG. 13, the stop condition of the object B3 may be a condition in which the velocity vector of the object B3 is attenuated and thereby the magnitude of the velocity becomes zero. That is to say, the display controller 113 may stop the object B3 when the velocity vector of the object B3 is attenuated in the second display area D2, and the magnitude of the velocity vector becomes zero.

Figure 14:
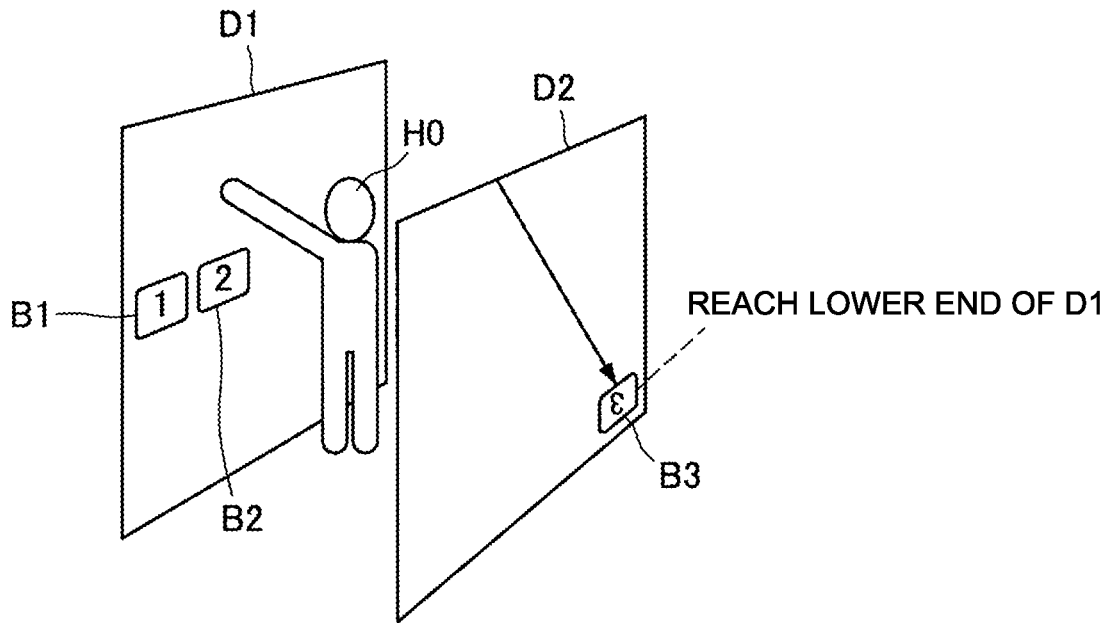
FIG. 14 is a diagram for illustrating a second example of the stop condition of the object.

FIG. 14 is a diagram for illustrating a second example of the stop condition of the object B3. As illustrated in FIG. 14, the stop condition of the object B3 may be a condition in which the object B3 has reached a lower end (a third end) opposite to the upper end (the second end) of the second display area D2. That is to say, the display controller 113 may stop the object B3 when the object B3 reaches the lower end (the third end) opposite to the upper end (the second end) of the second display area D2. A third example of the stop condition will be described below.

Figure 15:
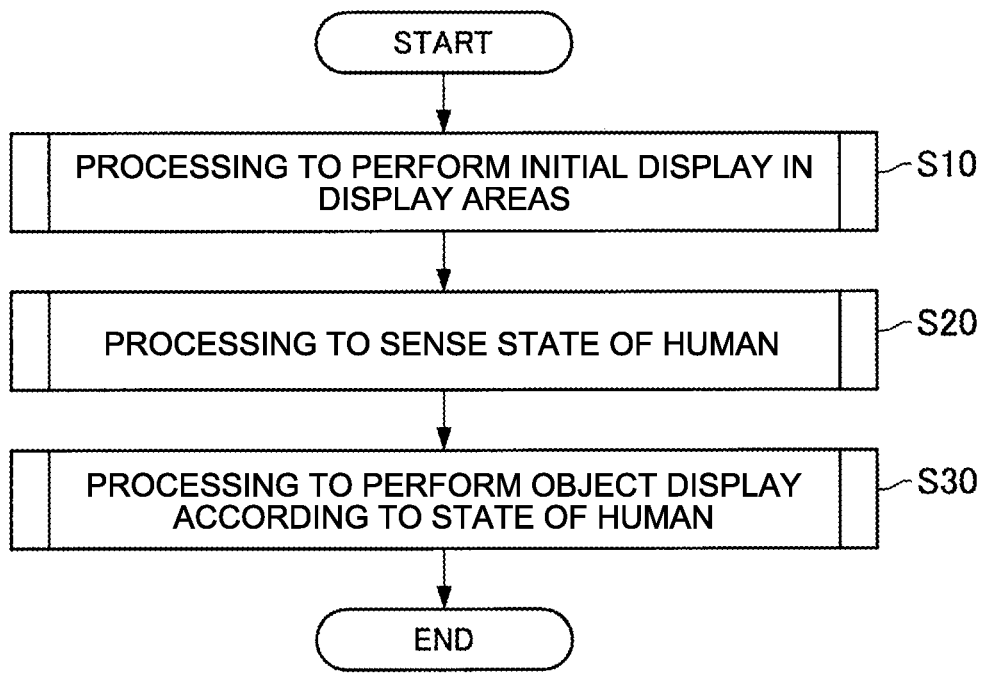
FIG. 15 is a flowchart of exemplary overall processing by the display control apparatus.

FIG. 15 is a flowchart of exemplary overall processing by the display control apparatus 10. As illustrated in FIG. 15, the display control apparatus 10 executes processing to perform initial display in the display areas (S10), executes processing to sense the state of the human H0 (S20), and executes processing to perform object display according to the state of the human H0 (S30). The following describes an example of S10 with reference to FIG. 16, an example of S20 with reference to FIG. 17, and an example of S30 as S30-1 and S30-2 with reference to FIG. 18 and FIG. 19.

Figure 16:
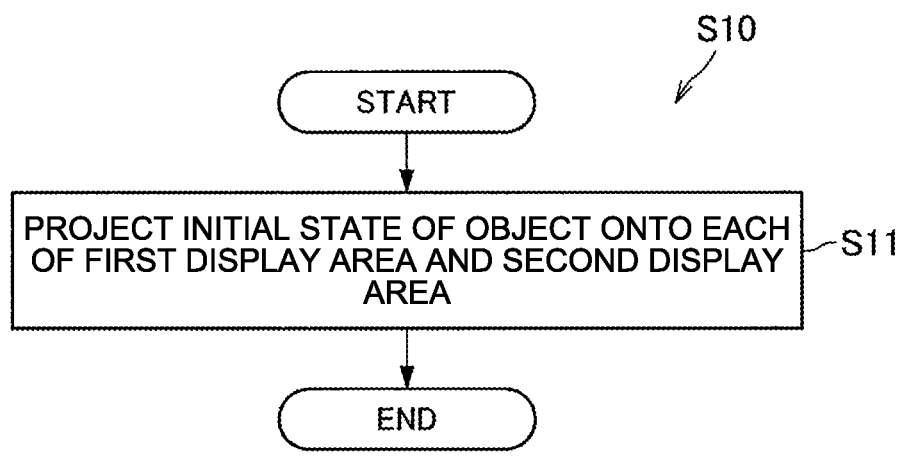
FIG. 16 is a diagram of exemplary processing to perform initial display in the display areas.

FIG. 16 is a diagram of exemplary processing to perform initial display in the display areas. As illustrated in FIG. 16, in the display control apparatus 10, the projector 30-1 and the projector 30-2 project (display) an initial state of an object onto each of the first display area D1 and the second display area D2 in accordance with control by the display controller 113. When there is no object to be projected in at least either the first display area D1 or the second display area D2, no object may be projected.

Figure 17:
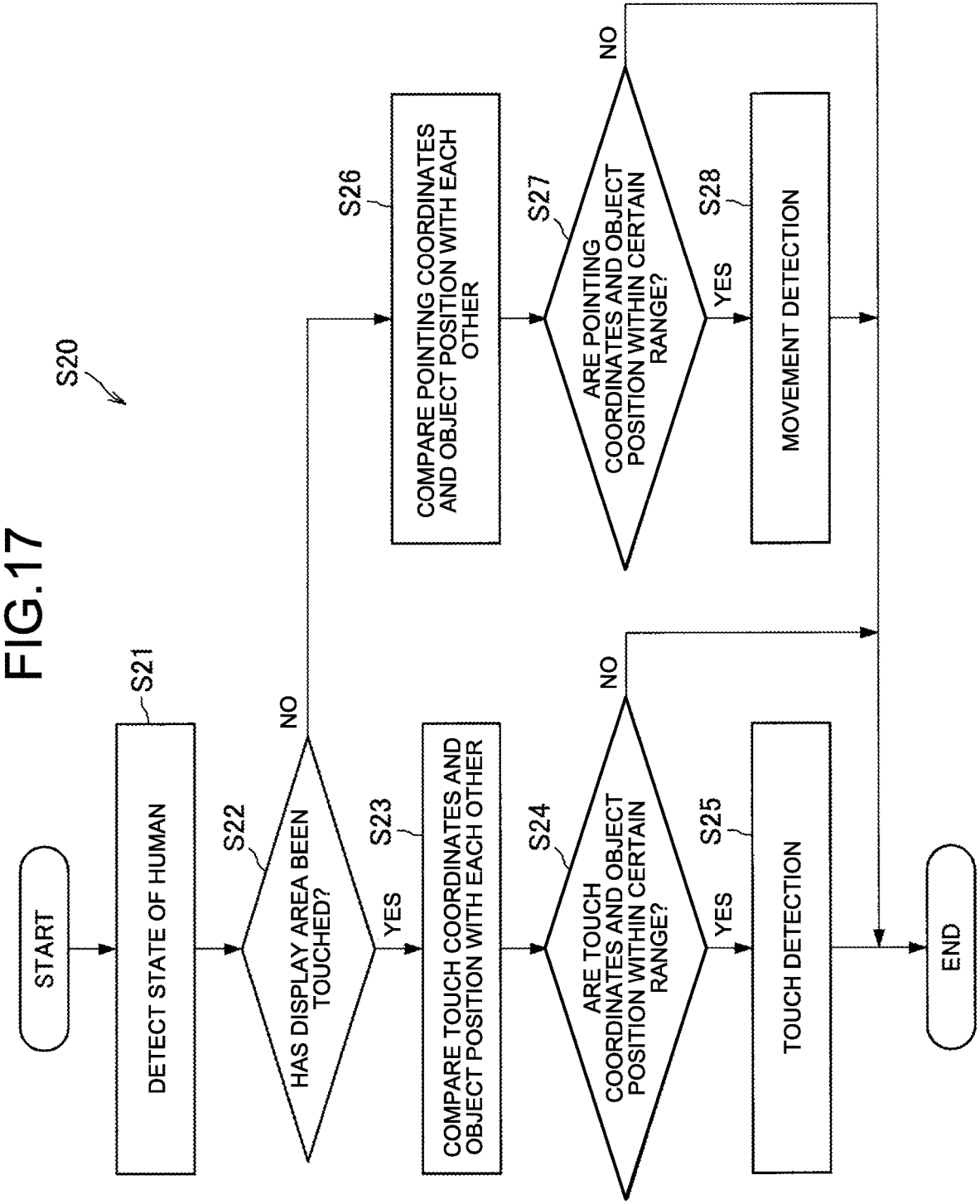
FIG. 17 is a diagram of exemplary processing to sense a state of a human.

FIG. 17 is a diagram of exemplary processing to sense the state of the human H0. First, the sensor 40 detects the state of the human H0 (S21). In the display control apparatus 10, the data acquisition unit 111 acquires the state of the human H0 detected by the sensor 40. The display controller 113 determines whether the human H0 touches the display area based on the state of the human H0 (S22).

If it is determined that the human H0 touches the display area (Yes at S22), the display controller 113 compares touch coordinates and an object position with each other (S23) and, if the touch coordinates and the object position are within a certain range (Yes at S24), determines that the human H0 has performed a touch operation (performs touch detection) (S25) and then ends the processing. On the other hand, if the touch coordinates and the object position are out of the certain range (No at S24), the display controller 113 ends the processing.

On the other hand, if it is determined that the human H0 has not touched the display area (No at S22), the display controller 113 compares the pointing coordinates and the object position with each other (S26) and, if the pointing coordinates and the object position are within a certain range (Yes at S27), determines that the human H0 has performed a movement operation (performs movement detection) (S28) and then ends the processing. On the other hand, if the pointing coordinates and the object position are out of the certain range (No at S27), the display controller 113 ends the processing.

Figure 18:
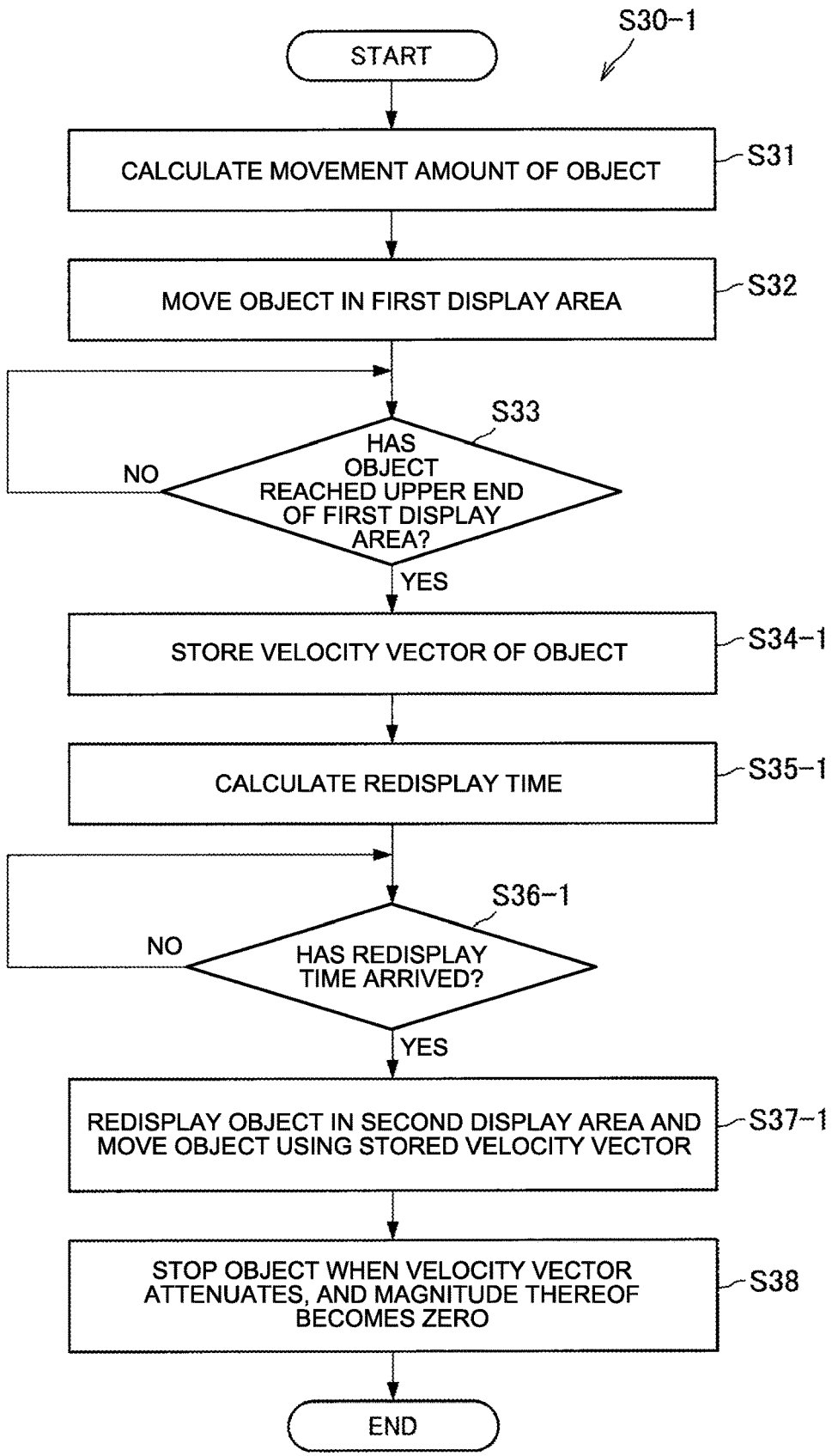
FIG. 18 is a diagram of exemplary processing to perform object display according to the state of the human.

FIG. 18 is a diagram of exemplary processing to perform object display according to the state of the human H0. Assumed is a case in which an object is caused to appear in the second display area D2 when a certain time has elapsed after reaching the upper end of the first display area D1. First, the display controller 113 calculates a movement amount of the object based on a movement amount of the pointing coordinates (S31) and then moves the object in the first display area D1 based on the movement amount of the object (S32).

Subsequently, the display controller 113 repeatedly executes S33 for a period when the object has not reached the upper end of the first display area D1 (No at S33) and, if the object reaches the upper end of the first display area D1 (Yes a S33), stores therein a velocity vector of the object (S34-1). The display controller 113 then calculates a redisplay timing of the object (S35-1).

Subsequently, the display controller 113 repeatedly executes S36-1 for the period when the redisplay timing of the object has not arrived (No at S36-1) and, if the redisplay timing of the object arrives (Yes at S36-1), redisplays the object in the second display area D2 and move the object using the stored velocity vector (S37-1). As an example, the display controller 113 stops the object when the velocity vector attenuates, and the magnitude of the velocity vector becomes zero (S38).

Figure 19:
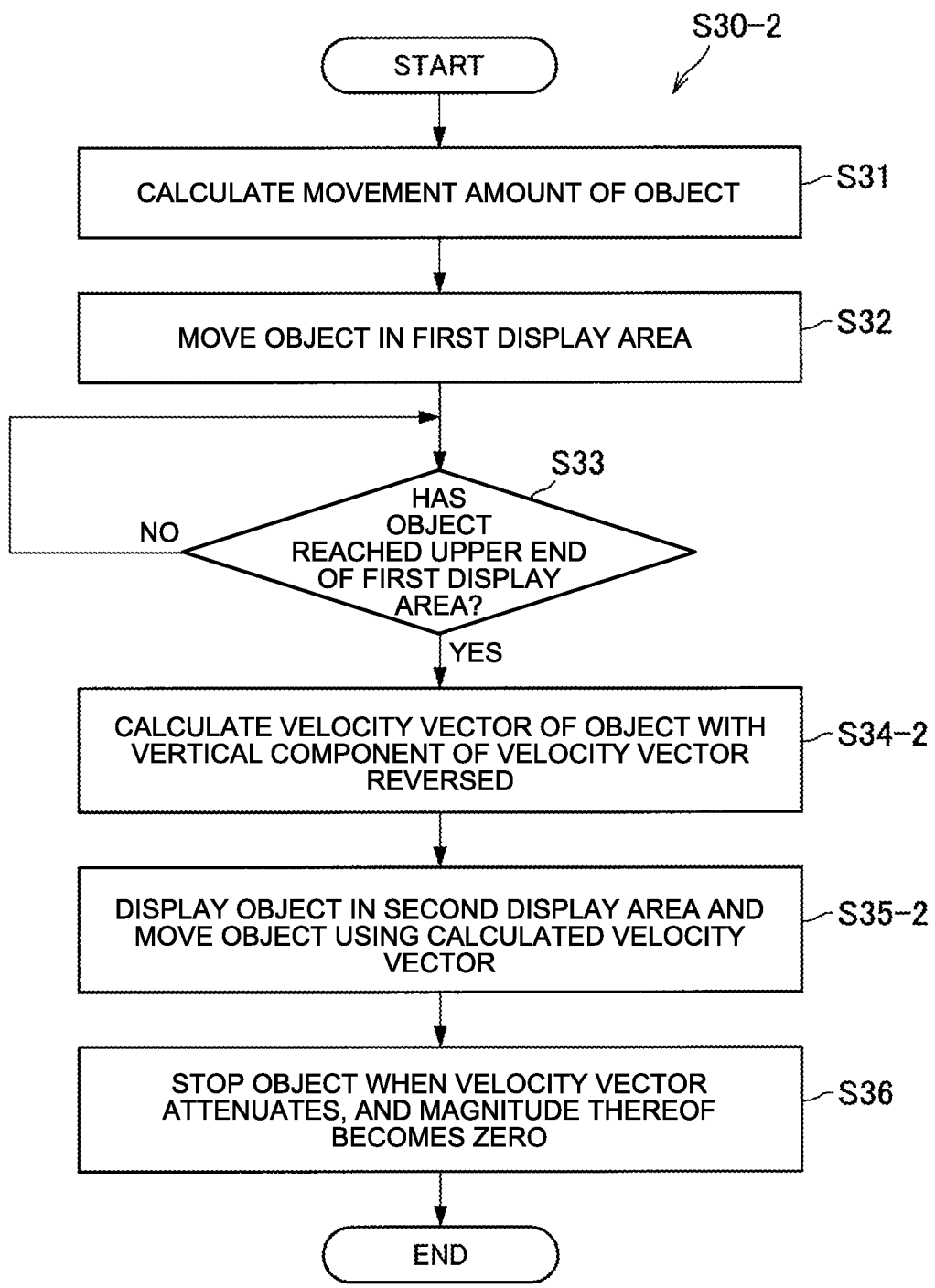
FIG. 19 is a diagram of exemplary processing to perform object display according to the state of the human.

FIG. 19 is a diagram of exemplary processing to perform object display according to the state of the human H0. Assumed is a case in which an object is caused to appear in the second display area D2 when reaching the upper end of the first display area D1. First, S31 to S33 are executed in like manner with the case described with reference to FIG. 18. If the object reaches the upper end of the first display area D1 (Yes at S33), the display controller 113 calculates a velocity vector of the object with a vertical component of the velocity vector reversed (S34-2).

Subsequently, the display controller 113 displays the object in the second display area D2 and moves the object using the calculated velocity vector (S35-2). As an example, the display controller 113 stops the object when the velocity vector attenuates, and the magnitude of the velocity vector becomes zero (S36).

Thus, the movement operation on the object from the first display area D1 to the second display area D2 has been described.

(1.3.2. Touch Operation on Object)

The following first describes a touch operation on the object. As described above, the object B3 may stop in the second display area D2 when the certain stop condition is satisfied. The above describes the first example and the second example of the stop condition of the object B3. The following describes a third example of the stop condition of the object B3.

Figure 20:
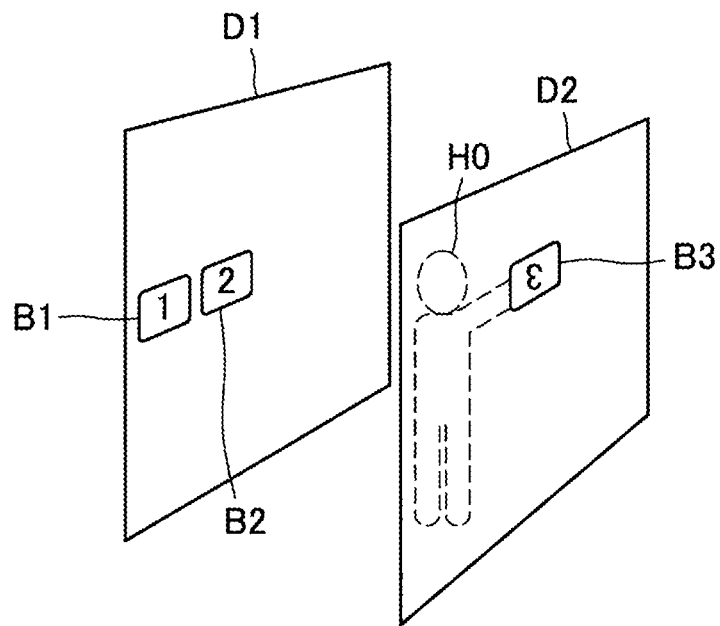
FIG. 20 is a diagram for illustrating a third example of the stop condition of the object.

FIG. 20 is a diagram for illustrating the third example of the stop condition of the object B3. As illustrated in FIG. 20, the stop condition of the object B3 may be a condition in which the human H0 touches the object B3. That is to say, the display controller 113 may stop the object B3 when the human H0 touches the object B3.

The above describes the third example of the stop condition of the object as an example of the touch operation on the object. However, the touch operation on the object may be used in other scenes. For example, an object may be selected by touch operation on the object.

Figure 21:
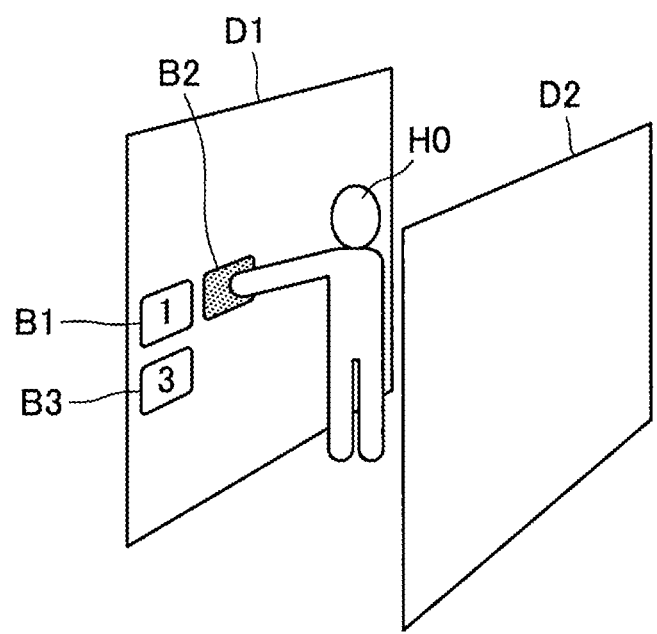
FIG. 21 is a diagram of an example in which a touch operation on the object selects the object.
Figure 22:
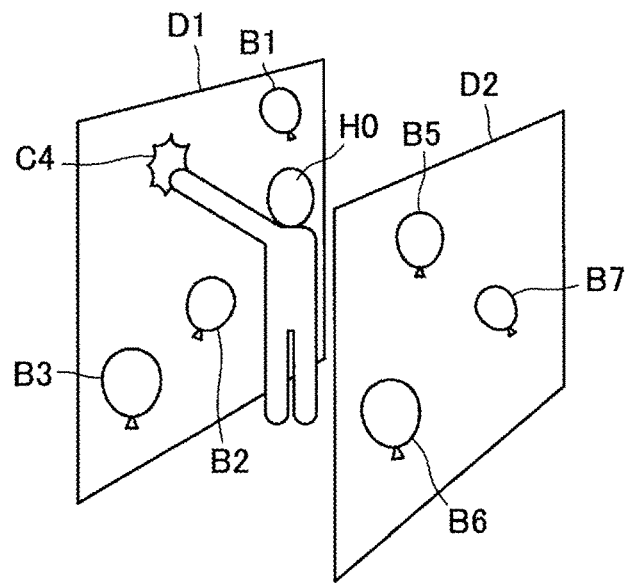
FIG. 22 is a diagram of an example in which the touch operation on the object selects the object.
Figure 23:
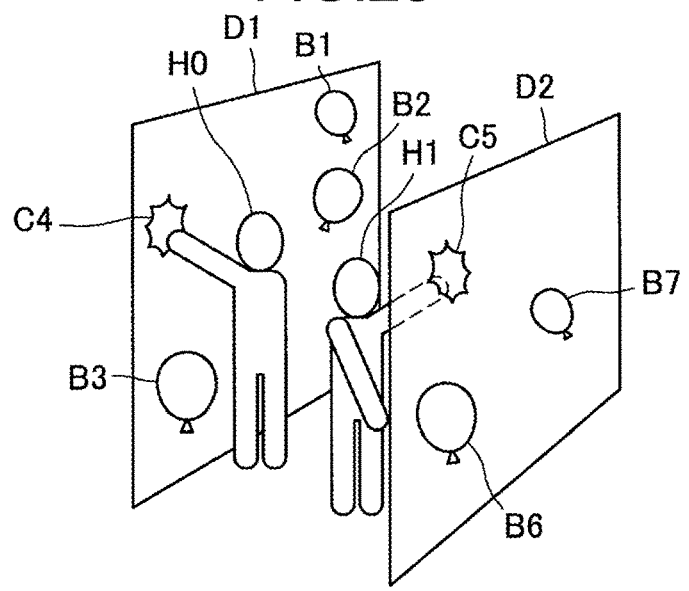
FIG. 23 is a diagram of an example in which the touch operation on the object selects the object.

FIG. 21 to FIG. 23 are diagrams of examples in which an object is selected by the touch operation on the object. Referring to FIG. 21, illustrated is an example in which the object B2 is selected when the human H0 touches the object B2.

Referring to FIG. 22, illustrated is an example in which the human H0 selects an object C4. FIG. 22 illustrates a case in which the objects B1 to B3 displayed in the first area D1 and B5 to B7 displayed in the second display area D2 are balloons. The object C4 indicates a balloon that has ruptured as a result of being selected by the human H0.

Referring to FIG. 23, illustrated is an example in which the human H0 selects the object C4, whereas a human H1 selects an object C5. FIG. 23 illustrates a case in which the objects B1 to B3 displayed in the first area D1 and B6 and B7 displayed in the second display area D2 are balloons. The object C4 indicates a balloon that has ruptured as a result of being selected by the human H0, whereas the object C5 indicates a balloon that has ruptured as a result of being selected by the human H1. Thus, a plurality of humans can simultaneously operate a plurality of objects.

Figure 24:
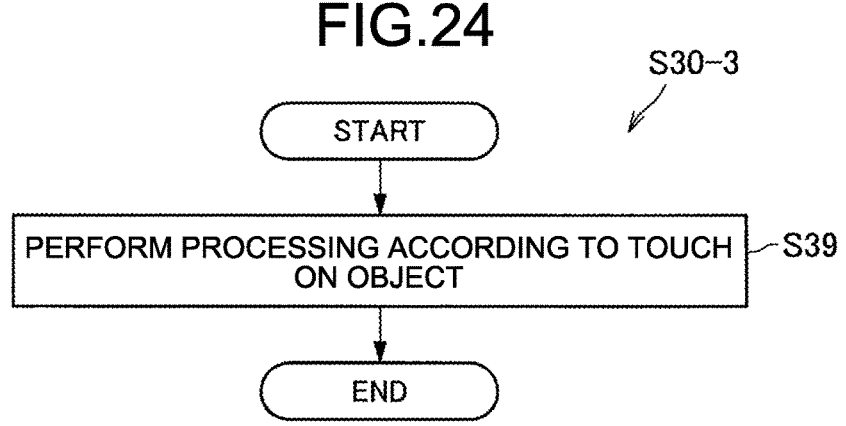
FIG. 24 is a diagram of another exemplary processing to perform object display according to the state of the human.

As described above, the processing to perform object display according to the state of the human H0 is performed (FIG. 15). The following describes another exemplary processing to perform object display according to the state of the human H0 as S30-3 with reference to FIG. 24. FIG. 24 is a diagram of the other exemplary processing to perform object display according to the state of the human H0. Assumed is a case in which the human H0 executes the touch operation. In this situation, the display controller 113 performs processing according to touching the object (S39).

(1.3.3. Modification of Operator)

Subsequently, the following describes a modification of the operator. The above mainly assumes a case in which the movement operation indicates the display area by the human from a remote position. However, a drag operation performed by the human while directly touching the display area may be treated as the movement operation. In that process, when the display area is equipped with a touch sensor, the drag operation may be detected by the touch sensor.

The above mainly describes cases in which a hand of a human is used as an example of the operator performing the movement operation and the touch operation. However, the operator is not limited to the hand of a human. For example, an object such as a pointing bar may be used in place of the hand of a human as the operator. In that case, coordinates indicated by the pointing bar (in a contact or a noncontact manner) may be regarded as the pointing coordinates. As the operator, a controller (a mouse or a tablet, for example) may be used in place of the human. Alternatively, the operator may be an object such as a fan.

Figure 25:
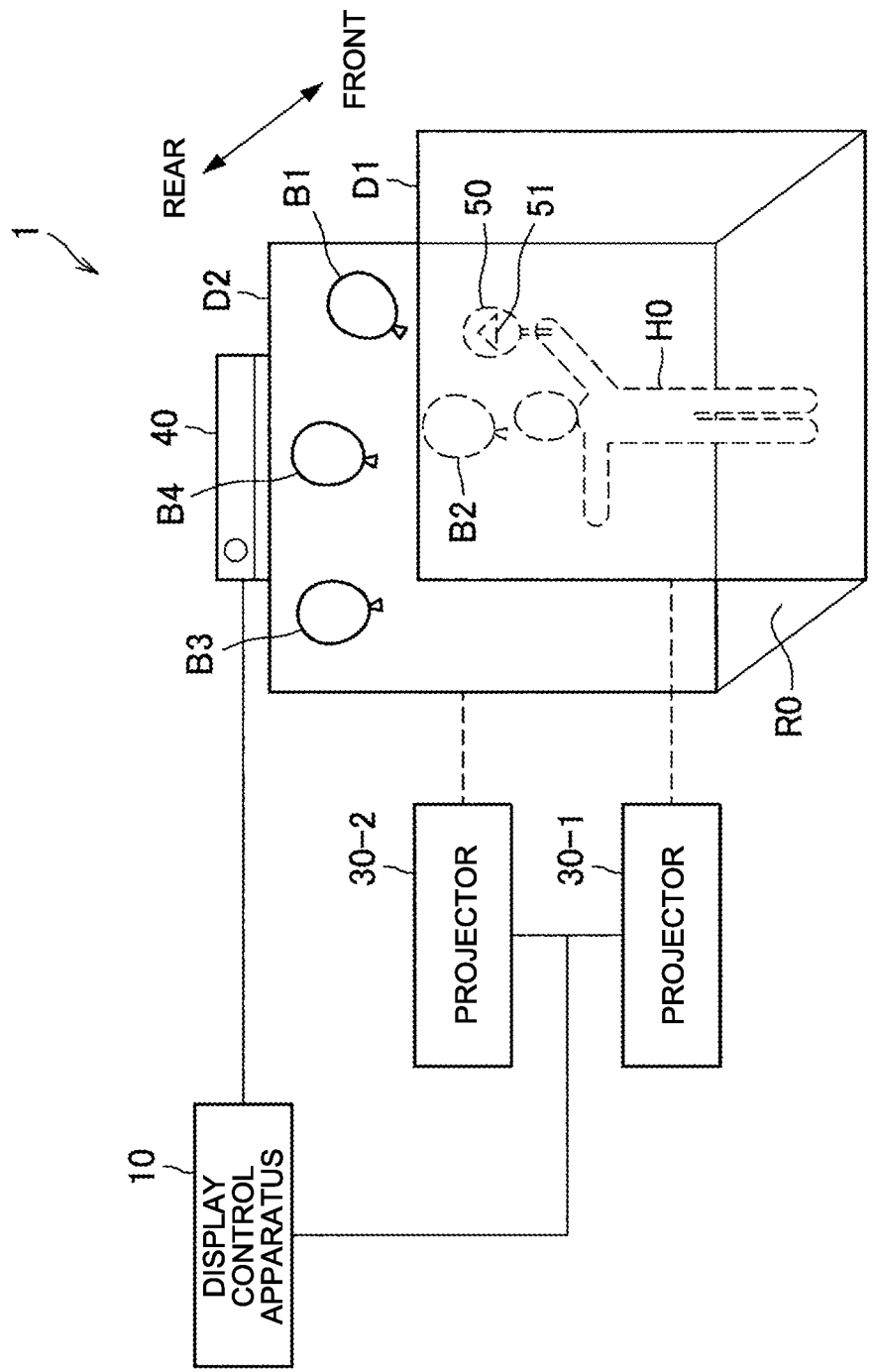
FIG. 25 is a diagram of a case in which a fan is used as an operator.

FIG. 25 is a diagram of a case in which a fan is used as the operator. Referring to FIG. 25, the human H0 holds a fan 50. Objects B1 to B4 (balloons) are displayed in the second display area D2. For example, when the human H0 moves the fan 50, a movement amount of the fan 50 may be detected by the sensor 40, supposing that a wind occurs in a direction and with magnitude according to the movement amount, the display controller 113 may calculate how the wind blows the objects B1 to B4, and based on a calculation result, the objects B1 to B4 may be moved.

The movement amount of the fan 50 may be determined based on a movement amount of pointing coordinates of the second display area D2 indicated by the fan 50. When a marker 51 is marked on the fan 50, the pointing coordinates may be detected based on the position and the attitude of the marker 51. However, even when the marker 51 is not marked on the fan 50, the pointing coordinates may be detected based on the position and the attitude of the fan 50 itself. The objects B1 to B4 may be displayed in the first display are D1, not in the second display area D2.

Thus, the modification of the operation has been described above.

[1.4. Exemplary Hardware Configuration]

Figure 26:
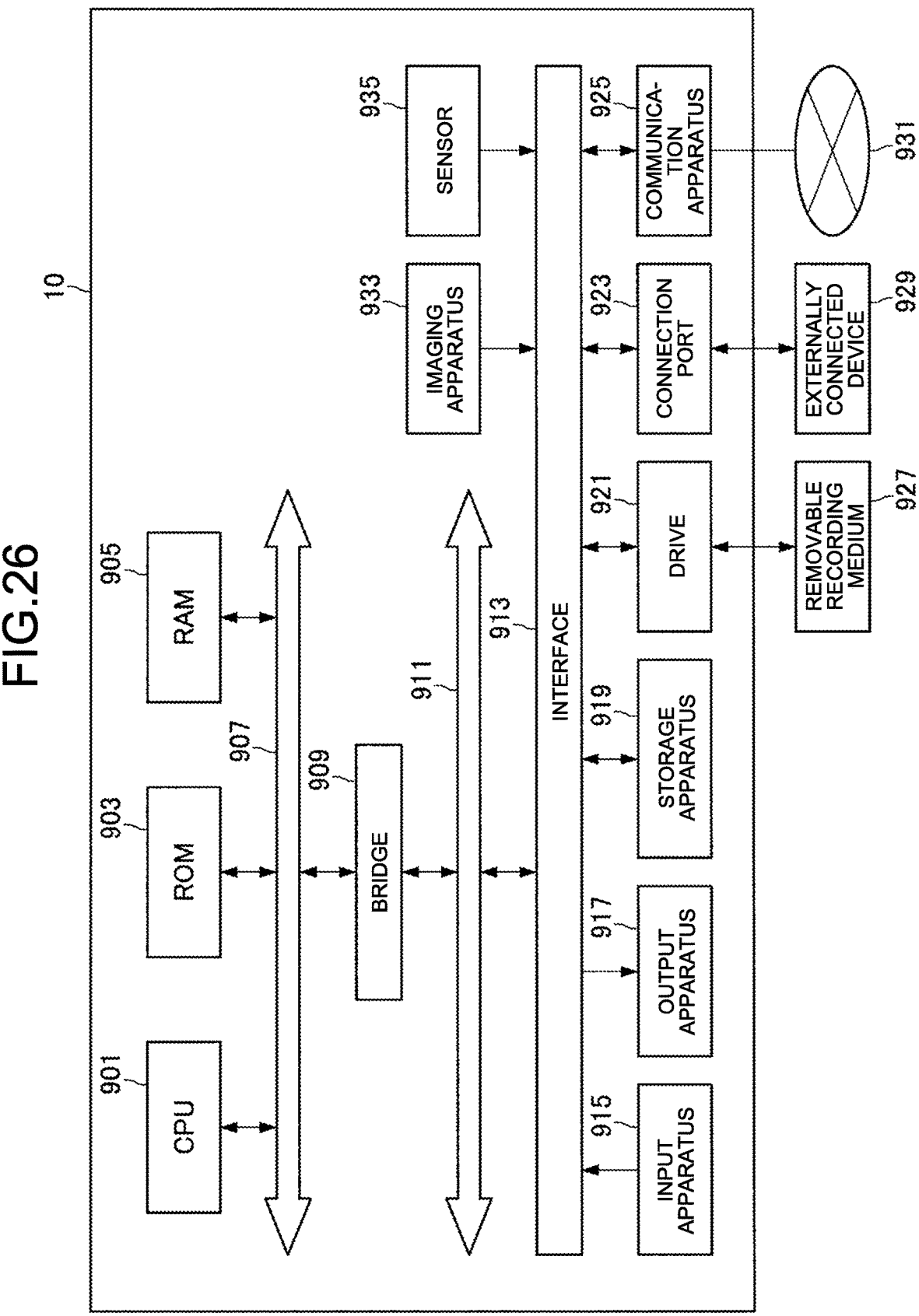
FIG. 26 is a block diagram of an exemplary hardware configuration of the display control apparatus.

The following describes a hardware configuration of the display control apparatus 10 according to the embodiment of the present disclosure with reference to FIG. 26. FIG. 26 is a block diagram of an exemplary hardware configuration of the display control apparatus 10 according to the embodiment of the present disclosure.

As illustrated in FIG. 26, the display control apparatus 10 includes a central processing unit (CPU) 801, a read only memory (ROM) 803, and a random access memory (RAM) 805. The display control apparatus 10 may include a host bus 807, a bridge 809, an external bus 811, an interface 813, a storage apparatus 819, a drive 821, a connection port 823, and a communication apparatus 825. The display control apparatus 10 may have a processing circuit called a digital signal processor (DSP) or an application specific integrated circuit (ASIC) in place of or together with the CPU 801.

The CPU 801 functions as an arithmetic processing unit and a control unit and controls the entire operation or part thereof in the display control apparatus 10 in accordance with various kinds of computer programs recorded in the ROM 803, the RAM 805, the storage apparatus 819, or a removable recording medium 827. The ROM 803 stores therein computer programs and arithmetic parameters used by the CPU 801. The RAM 805 temporarily stores therein computer programs used in the execution of the CPU 801, parameters changing as appropriate in the execution, and the like. The CPU 801, the ROM 803, and the RAM 805 are connected to each other with the host bus 807 formed by an internal bus such as a CPU bus. Further, the host bus 807 is connected to an external bus 811 such as a Peripheral Component Interconnect/Interface (PCI) bus via the bridge 809.

The storage apparatus 819 is an apparatus for data storage configured as an exemplary storage unit of the display control apparatus 10. The storage apparatus 819 includes a magnetic storage device such as a hard disk drive (HDD), a semiconductor storage device, an optical storage device, or a magneto-optical storage device, for example. This storage apparatus 819 stores therein computer programs and various kinds of data executed by the CPU 801, various kinds of data externally acquired, and the like.

The drive 821 is a reader/writer for the removable recording medium 827 such as a magnetic disc, an optical disc, a magneto-optical disc, or a semiconductor memory and is incorporated in or externally mounted on the display control apparatus 10. The drive 821 reads information recorded in the removable recording medium 827 installed therein and outputs the information to the RAM 805. The drive 821 writes recording into the removable recording medium 827 installed therein.

The connection port 823 is a port for directly connecting devices to the display control apparatus 10. The connection port 823 can be a Universal Serial Bus (USB) port, an IEEE1394 port, or a Small Computer System Interface (SCSI) port, for example. The connection port 823 may be an RS-232C port, an optical audio terminal, a High-Definition Multimedia Interface (HDMI (registered trademark)) port, or the like. An externally connected device 829 is connected to the connection port 823 to enable various kinds of data to be exchanged between the display control apparatus 10 and the externally connected device 829.

The communication apparatus 825 is a communication interface including a communication device for connecting to a network 931, for example. The communication apparatus 825 can be a communication card for wired or wireless Local Area Network (LAN), Bluetooth (registered trademark), or Wireless USB (WUSB), for example. The communication apparatus 825 may be a router for optical communication, a router for Asymmetric Digital Subscriber Line (ADSL), a modem for various kinds of communications, or the like. The communication apparatus 825 transmits and receives signals or the like to and from the Internet or other communication devices using a certain protocol such as TCP/IP, for example. The network 931 connected to the communication apparatus 825 is a network connected in a wired or wireless manner and is the Internet, home LAN, infrared communication, radio wave communication, or satellite communication, for example.

2. CONCLUSION

As described in the foregoing, the embodiment of the present disclosure provides a display control apparatus including a display controller, based on a movement operation by a human present in a space between a first display area and a second display area on a display object in the first display area, moving the display object, the display controller, when the display object reaches a first end of the first display area, causing the display object to appear at a second end of the second display area corresponding to the first end. According to the configuration, the display object can be presented such that movement of the display object from one display area to another display area can be grasped more intuitively.

Thus, the preferred embodiment of the present disclosure has been described in detail with reference to the accompanying drawings; the technical scope of the present disclosure is not limited to the example. It is clear that those having ordinary skills in the technical field of the present disclosure can think of various kinds of modifications and revisions within the scope of the technical thought described in the claims, and it is understood that these also naturally belong to the technical scope of the present disclosure.

The effect described in the present specification is only illustrative or by way of example and is not limiting. That is to say, the technique according to the present disclosure can produce other effects obvious to those skilled in the art from the description of the present specification together with the above effect or in place of the above effect.

The following configurations also belong to the technical scope of the present disclosure.

(1)

A display control apparatus comprising a display controller, based on a movement operation by a human present in a space between a first display area and a second display area on a display object in the first display area, moving the display object, the display controller, when the display object reaches a first end of the first display area, causing the display object to appear at a second end of the second display area corresponding to the first end.

(2)

The display control apparatus according to (1), wherein the first end is an upper end of the first display area, and the second end is an upper end of the second display area.

(3)

The display control apparatus according to (1) or (2), wherein the display controller determines a second velocity vector of the display object in the second display area based on a first velocity vector of the display object in the first display area.

(4)

The display control apparatus according to (3), wherein the display controller determines the second velocity vector by reversing a vertical component of the first velocity vector.

(5)

The display control apparatus according to any one of (1) to (4), wherein the display controller, when the display object reaches the first end, performs control whether the display object is caused to appear at the second end based on a type of the movement operation.

(6)

The display control apparatus according to (5), wherein a type of the movement operation includes a number of operators performing the movement operation.

(7)

The display control apparatus according to (6), wherein the display controller, when the display object reaches the first end, causes the display object not to appear at the second end when the number of operators is a first number and causes the display object to appear at the second end when the number of operators is a second number, which is different from the first number.

(8)

The display control apparatus according to any one of (1) to (7), wherein the display controller, when the display object reaches the first end, performs control whether the display object is caused to appear at the second end based on a parameter related to movement of the display object.

(9)

The display control apparatus according to (8), wherein the display controller, when the display object reaches the first end, causes the display object not to appear at the second end when the parameter related to movement is lower than a threshold and causes the display object to appear at the second end when the parameter related to movement of the display object is higher than the threshold.

(10)

The display control apparatus according to any one of (1) to (9), wherein the display controller controls movement of the display object in at least part of the first display area and the second display area on the assumption that the display object has moved while receiving gravity in the at least part.

(11)

The display control apparatus according to any one of (1) to (10), wherein the display controller controls the display object such that a velocity vector of the display object in at least part of the first display area and the second display area is constant.

(12)

The display control apparatus according to any one of (1) to (11), wherein the display controller controls the display object such that a velocity vector of the display object in at least part of the first display area and the second display area is attenuated.

(13)

The display control apparatus according to any one of (1) to (12), wherein the display controller stops the display object when the display object reaches a third end opposite to the second end in the second display area, when the human touches the display object, or when a velocity vector of the display object is attenuated and thereby the magnitude of the velocity vector becomes zero.

(14) The display control apparatus according to any one of (1) to (13), wherein the display controller, when the first end is set as a boundary, starts to cause the display object to appear at the second end when the display object reaches the boundary.

(15) The display control apparatus according to any one of (1) to (13), wherein the display controller, when a virtual line outside the first display area is set as a boundary, starts to cause the display object to appear at the second end when the display object reaches the boundary.

(16) The display control apparatus according to (15), wherein the display controller sets the virtual line at a position separated from the first end by a length corresponding to a spacing between the first display area and the second display area or a velocity vector of the display object.

(17) The display control apparatus according to any one of (1) to (13), wherein when the first end is set as a boundary, the display controller starts to cause the display object to appear at the second end when the display object again reaches the boundary on the assumption that the display object has moved while receiving gravity in a space outside the first end.

(18) The display control apparatus according to any one of (14) to (17), wherein when there is a first part beyond the boundary in the display object, the display controller performs control to cause a second part corresponding to the first part to be displayed in the second display area.

(19) A display control method comprising, based on a movement operation by a human present in a space between a first display area and a second display area on a display object in the first display area, moving the display object; and
by a processor, when the display object reaches a first end of the first display area, causing the display object to appear at a second end of the second display area corresponding to the first end.

(20) A computer program for causing a computer to function as a display control apparatus comprising a display controller, based on a movement operation by a human present in a space between a first display area and a second display area on a display object in the first display area, moving the display object,
the display controller, when the display object reaches a first end of the first display area, causing the display object to appear at a second end of the second display area corresponding to the first end.

REFERENCE SIGNS LIST

1 Display control system
10 Display control apparatus
110 Controller
111 Data acquisition unit
113 Display controller
120 Storage unit
30 Projector
40 Sensor
50 Fan
51 Marker
D1 First display area
D2 Second display area
H0 Human
R0 Inner area

The invention claimed is:

1. A display control apparatus comprising:
a display controller configured to move a display object based on a movement operation by a human present in a space between a first display area and a second display area on a display object in the first display area,
wherein the display controller moves the display object by causing the display object to appear at a second end of the second display area corresponding to a first end of the first display area when the display object reaches the first end of the first display area, and
wherein the display controller further moves the display object by determining a second velocity vector of the display object in the second display area based on a first velocity vector of the display object in the first display area.

2. The display control apparatus according to claim 1, wherein
the first end is an upper end of the first display area, and
the second end is an upper end of the second display area.

3. The display control apparatus according to claim 1, wherein the display controller determines the second velocity vector by reversing a vertical component of the first velocity vector.

4. The display control apparatus according to claim 1, wherein the display controller, when the display object reaches the first end, performs control whether the display object is caused to appear at the second end based on a type of the movement operation.

5. The display control apparatus according to claim 4, wherein a type of the movement operation includes a number of operators performing the movement operation.

6. The display control apparatus according to claim 5, wherein the display controller, when the display object reaches the first end, causes the display object not to appear at the second end when the number of operators is a first number and causes the display object to appear at the second end when the number of operators is a second number, which is different from the first number.

7. The display control apparatus according to claim 1, wherein the display controller, when the display object reaches the first end, performs control whether the display object is caused to appear at the second end based on a parameter related to movement of the display object.

8. The display control apparatus according to claim 7, wherein the display controller, when the display object reaches the first end, causes the display object not to appear at the second end when the parameter related to movement is lower than a threshold and causes the display object to appear at the second end when the parameter related to movement of the display object is higher than the threshold.

9. The display control apparatus according to claim 1, wherein the display controller controls movement of the display object in at least part of the first display area and the second display area on the assumption that the display object has moved while receiving gravity in the at least part.

10. The display control apparatus according to claim 1, wherein the display controller controls the display object such that a velocity vector of the display object in at least part of the first display area and the second display area is constant.

11. The display control apparatus according to claim 1, wherein the display controller controls the display object such that a velocity vector of the display object in at least part of the first display area and the second display area is attenuated.

12. The display control apparatus according to claim 1, wherein the display controller stops the display object when the display object reaches a third end opposite to the second end in the second display area, when the human touches the display object, or when a velocity vector of the display object is attenuated and thereby the magnitude of the velocity vector becomes zero.

13. The display control apparatus according to claim 1, wherein the display controller, when the first end is set as a boundary, starts to cause the display object to appear at the second end when the display object reaches the boundary.

14. The display control apparatus according to claim 13, wherein when there is a first part beyond the boundary in the display object, the display controller performs control to cause a second part corresponding to the first part to be displayed in the second display area.

15. The display control apparatus according to claim 1, wherein the display controller, when a virtual line outside the first display area is set as a boundary, starts to cause the display object to appear at the second end when the display object reaches the boundary.

16. The display control apparatus according to claim 15, wherein the display controller sets the virtual line at a position separated from the first end by a length corresponding to a spacing between the first display area and the second display area or a velocity vector of the display object.

17. The display control apparatus according to claim 1, wherein when the first end is set as a boundary, the display controller starts to cause the display object to appear at the second end when the display object again reaches the boundary on the assumption that the display object has moved while receiving gravity in a space outside the first end.

18. A display control method comprising moving a display object based on a movement operation by a human present in a space between a first display area and a second display area on the display object in the first display area; and
causing the display object to appear at a second end of the second display area corresponding to a first end of the first display area when the display object reaches the first end of the first display area,
wherein the display object is moved by determining a second velocity vector of the display object in the second display area based on a first velocity vector of the display object in the first display area.

19. A non-transitory computer-readable storage medium having embodied thereon a computer program, which when executed by a computer causes the computer to function as execute a display control method, the method comprising
moving a display object based on a movement operation by a human present in a space between a first display area and a second display area on the display object in the first display area; and
causing the display object to appear at a second end of the second display area corresponding to a first end of the first display area when the display object reaches the first end of the first display area,
wherein the display object is moved by determining a second velocity vector of the display object in the second display area based on a first velocity vector of the display object in the first display area.

* * * * *